(12) United States Patent
Volkmer et al.

(10) Patent No.: US 12,228,249 B2
(45) Date of Patent: Feb. 18, 2025

(54) POLYMERIC LINER BASED GAS CYLINDER WITH REDUCED PERMEABILITY

(71) Applicant: Agility Fuel Systems LLC, Costa Mesa, CA (US)

(72) Inventors: Michael Gregory Volkmer, Lincoln, NE (US); Dustin Joseph John, Lincoln, NE (US); Chad Alvin Cederberg, Lincoln, NE (US); David Neil Morgan, Weston, NE (US); John David Makinson, Lincoln, NE (US)

(73) Assignee: Agility Fuel Systems LLC, Costa Mesa, CA (US)

(*) Notice: Subject to any disclaimer, the term of this patent is extended or adjusted under 35 U.S.C. 154(b) by 0 days.

(21) Appl. No.: 18/585,715

(22) Filed: Feb. 23, 2024

(65) Prior Publication Data
US 2024/0271757 A1    Aug. 15, 2024

Related U.S. Application Data

(63) Continuation of application No. 17/452,950, filed on Oct. 29, 2021, now Pat. No. 11,940,098, which is a
(Continued)

(51) Int. Cl.
*F17C 13/00* (2006.01)
*B32B 1/08* (2006.01)
(Continued)

(52) U.S. Cl.
CPC .............. *F17C 13/002* (2013.01); *B32B 1/08* (2013.01); *B32B 7/12* (2013.01); *B32B 15/082* (2013.01);
(Continued)

(58) Field of Classification Search
CPC ............ F17C 1/10; F17C 1/16; F17C 13/002; F17C 2203/0607; F17C 2203/0604;
(Continued)

(56) References Cited

U.S. PATENT DOCUMENTS 2,479,828 A    8/1949    Geckler
2,723,705 A    11/1955   Collins
(Continued)

FOREIGN PATENT DOCUMENTS

DE    10 2017 208492    11/2018
EP    1 574 320 B1    10/2008
(Continued)

OTHER PUBLICATIONS

EHA Composite Machinery GmbH Brochure, in 10 pages.
(Continued)

*Primary Examiner* — Jeffrey J Restifo
(74) *Attorney, Agent, or Firm* — Knobbe, Martens, Olson & Bear, LLP

(57) ABSTRACT

Disclosed are gas cylinder assemblies for containing pressurized gas. The gas cylinder assembly has a polymeric liner and a low-permeability barrier layer. The polymeric liner a first end portion, a second end portion and a central body. The central body comprises an outer surface and an inner surface disposed between the first end and the second end. The gas cylinder assembly comprises a reinforcement structure wound over the central body. The gas cylinder assembly further comprises a metal foil interposed between the reinforcement structure and central body. The metal foil is configured to reduce permeation of contents of the polymeric liner.

30 Claims, 18 Drawing Sheets

Related U.S. Application Data continuation of application No. PCT/US2020/031104, filed on May 1, 2020.

(60) Provisional application No. 62/842,366, filed on May 2, 2019.

(51) Int. Cl.

| | |
|---|---|
| *B32B 7/12* | (2006.01) |
| *B32B 15/082* | (2006.01) |
| *B32B 15/20* | (2006.01) |
| *B32B 27/08* | (2006.01) |
| *B32B 27/30* | (2006.01) |
| *B32B 27/32* | (2006.01) |
| *B60K 15/03* | (2006.01) |
| *B62D 21/02* | (2006.01) |
| *B62D 33/06* | (2006.01) |
| *F02M 21/02* | (2006.01) |
| *F17C 1/04* | (2006.01) |

(52) U.S. Cl.
CPC .............. *B32B 15/20* (2013.01); *B32B 27/08* (2013.01); *B32B 27/304* (2013.01); *B32B 27/306* (2013.01); *B32B 27/32* (2013.01); *B60K 15/03006* (2013.01); *B62D 21/02* (2013.01); *B62D 33/0617* (2013.01); *F02M 21/0221* (2013.01); *F17C 1/04* (2013.01); *B32B 2307/7265* (2013.01); *B32B 2597/00* (2013.01); *B32B 2605/08* (2013.01); *F17C 2201/0109* (2013.01); *F17C 2201/0119* (2013.01); *F17C 2201/0128* (2013.01); *F17C 2201/056* (2013.01); *F17C 2203/012* (2013.01); *F17C 2203/0604* (2013.01); *F17C 2203/0607* (2013.01); *F17C 2203/0609* (2013.01); *F17C 2203/0619* (2013.01); *F17C 2203/0621* (2013.01); *F17C 2203/0624* (2013.01); *F17C 2203/0646* (2013.01); *F17C 2203/066* (2013.01); *F17C 2203/0673* (2013.01); *F17C 2203/068* (2013.01); *F17C 2209/221* (2013.01); *F17C 2209/232* (2013.01); *F17C 2221/033* (2013.01); *F17C 2223/0123* (2013.01); *F17C 2265/066* (2013.01); *F17C 2270/0105* (2013.01); *F17C 2270/0171* (2013.01); *F17C 2270/0176* (2013.01); *F17C 2270/0178* (2013.01); *F17C 2270/0189* (2013.01)

(58) Field of Classification Search
CPC ...... F17C 2203/0634; F17C 2203/0636; F17C 2203/0646; F17C 2203/0648; B60K 15/0636; B60K 15/03177; B60K 15/03039; B60K 15/03046; B60K 15/03032; B60K 15/03059

See application file for complete search history.

(56) References Cited

U.S. PATENT DOCUMENTS

| | | | |
|---|---|---|---|
| 3,074,584 A | 1/1963 | Dobell | |
| 3,312,575 A | 4/1967 | Corbin, Jr. | |
| 3,321,347 A | 5/1967 | Price et al. | |
| 3,669,816 A | 6/1972 | Smith | |
| 3,795,573 A | 3/1974 | Smith et al. | |
| 3,843,010 A | 10/1974 | Morse et al. | |
| 4,191,304 A * | 3/1980 | Schiedat | F24H 1/181 220/567.3 |
| 4,438,858 A | 3/1984 | Grover | |
| 4,660,738 A | 4/1987 | Ives | |
| 4,760,949 A | 8/1988 | Elias | |
| 4,927,038 A | 5/1990 | Roebuck | |
| 5,150,812 A * | 9/1992 | Adams | F17C 1/16 220/560.04 |
| 5,287,987 A * | 2/1994 | Gaiser | F17C 1/16 220/62.22 |
| 5,287,988 A * | 2/1994 | Murray | F17C 1/16 220/589 |
| 5,368,184 A | 11/1994 | Fay et al. | |
| 5,419,139 A | 5/1995 | Blum et al. | |
| 5,476,189 A | 12/1995 | Duvall et al. | |
| 5,499,739 A | 3/1996 | Greist, III et al. | |
| 5,567,296 A * | 10/1996 | Luch | B60K 15/03177 205/176 |
| 5,577,630 A * | 11/1996 | Blair | F17C 1/16 220/586 |
| 5,758,796 A * | 6/1998 | Nishimura | F17C 1/06 220/651 |
| 5,798,156 A | 8/1998 | Mitkitsky | |
| 5,822,838 A | 10/1998 | Seal et al. | |
| 6,145,692 A | 11/2000 | Cherevatsky | |
| 6,158,794 A | 12/2000 | Flanagan | |
| 6,510,961 B1 | 1/2003 | Head et al. | |
| 6,630,529 B2 | 10/2003 | Robichaud | |
| 6,708,502 B1 * | 3/2004 | Aceves | F17C 3/08 220/560.08 |
| 6,986,490 B2 | 1/2006 | Eihusen et al. | |
| 7,208,207 B2 | 4/2007 | Ono et al. | |
| 7,211,307 B2 | 5/2007 | Potter et al. | |
| 7,641,949 B2 | 1/2010 | DeLay et al. | |
| 7,735,536 B2 | 6/2010 | Mukai et al. | |
| 7,743,940 B2 | 6/2010 | Brunnhofer | |
| 7,810,754 B2 | 10/2010 | Uozumi et al. | |
| 7,815,141 B2 | 10/2010 | Uozumi et al. | |
| 7,832,235 B2 | 11/2010 | Neubert et al. | |
| 7,905,442 B2 | 3/2011 | Uozumi et al. | |
| 8,048,248 B2 | 11/2011 | Neubert | |
| 8,074,826 B2 | 12/2011 | Cronin et al. | |
| 8,113,457 B2 | 2/2012 | Tanigawa et al. | |
| 8,308,017 B2 | 11/2012 | Schlag | |
| 8,313,595 B2 | 11/2012 | Blanc et al. | |
| 8,668,108 B2 | 3/2014 | Yeggy et al. | |
| 9,011,622 B2 | 4/2015 | Radtke | |
| 9,074,685 B2 | 7/2015 | Strack et al. | |
| 9,103,500 B2 | 8/2015 | Newhouse et al. | |
| 9,156,202 B2 | 10/2015 | Tanigawa et al. | |
| 9,302,437 B2 | 4/2016 | Radtke | |
| 9,545,770 B2 * | 1/2017 | Miller | B32B 27/32 |
| 9,618,160 B2 | 4/2017 | Eihusen et al. | |
| 9,688,508 B2 | 6/2017 | Tanigawa et al. | |
| 10,088,110 B2 | 10/2018 | Newhouse et al. | |
| 10,287,052 B2 | 5/2019 | Vanswijgenhoven | |
| 10,465,848 B1 | 11/2019 | Newhouse et al. | |
| 10,481,133 B2 | 11/2019 | Eihusen et al. | |
| 10,544,901 B2 | 1/2020 | Newhouse et al. | |
| 10,627,048 B2 | 4/2020 | Morgan | |
| 10,627,049 B2 | 4/2020 | Schimenti et al. | |
| 10,641,431 B2 | 5/2020 | Mallick et al. | |
| 10,648,620 B2 | 5/2020 | Yeggy et al. | |
| 10,670,191 B2 | 6/2020 | Yeggy et al. | |
| 10,737,445 B1 | 8/2020 | Kayhart et al. | |
| 10,746,354 B2 | 8/2020 | Moutray et al. | |
| 10,753,474 B2 | 8/2020 | Moutray et al. | |
| 10,760,741 B2 | 9/2020 | Moutray et al. | |
| 10,823,333 B2 | 11/2020 | Criel et al. | |
| 10,851,945 B2 | 12/2020 | Glaesemann et al. | |
| 10,928,010 B2 | 2/2021 | Halvorsen et al. | |
| 11,015,762 B2 * | 5/2021 | Mahieu | F17C 13/00 |
| 11,262,025 B2 * | 3/2022 | Kim | F17C 1/10 |
| 11,312,229 B1 * | 4/2022 | Yordanov | F02M 21/0221 |
| 11,559,964 B2 * | 1/2023 | Benson | B32B 5/245 |
| 11,560,982 B2 * | 1/2023 | Volkmer | B32B 27/08 |
| 11,940,097 B2 * | 3/2024 | Clarke | F17C 13/002 |
| 11,940,098 B2 | 3/2024 | Volkmer et al. | |
| 12,085,228 B2 * | 9/2024 | Nagamatsu | B29C 53/602 |
| 2002/0041823 A1 * | 4/2002 | Blaszczyk | F17C 5/02 422/1 |
| 2002/0053573 A1 * | 5/2002 | Bowen | F17C 1/002 220/581 |

(56) References Cited

U.S. PATENT DOCUMENTS

| | | |
|---|---|---|
| 2004/0056390 A1 | 3/2004 | Yeh |
| 2005/0077643 A1 | 4/2005 | Matsuoka |
| 2005/0191435 A1 | 9/2005 | Bauman |
| 2009/0057319 A1* | 3/2009 | Schlag .................. B29C 70/86 220/586 |
| 2009/0308874 A1* | 12/2009 | Lindner .................. F17C 1/16 220/591 |
| 2011/0210475 A1 | 9/2011 | Strack et al. |
| 2011/0220660 A1* | 9/2011 | Strack .................. F17C 1/06 220/601 |
| 2011/0304083 A1 | 12/2011 | Strack |
| 2012/0024745 A1 | 2/2012 | Otsuka et al. |
| 2012/0214088 A1* | 8/2012 | Breuer ............ B60K 15/03006 429/515 |
| 2013/0299504 A1* | 11/2013 | Koppert .................. F17C 1/16 220/586 |
| 2013/0313266 A1 | 11/2013 | Andernach et al. |
| 2014/0008373 A1 | 1/2014 | Sharp et al. |
| 2014/0138173 A1 | 5/2014 | Gibb et al. |
| 2014/0272670 A1* | 9/2014 | Strack .................. F17C 13/00 429/535 |
| 2014/0326732 A1 | 11/2014 | Hutzen et al. |
| 2015/0044407 A1 | 2/2015 | Som et al. |
| 2015/0096994 A1 | 4/2015 | Radtke |
| 2015/0192251 A1 | 7/2015 | Tupper et al. |
| 2015/0240993 A1 | 8/2015 | DeLay |
| 2016/0082910 A1* | 3/2016 | Sloan .................. B60R 19/023 293/128 |
| 2017/0045181 A1 | 2/2017 | Watanabe et al. |
| 2017/0101003 A1* | 4/2017 | Zimmerman ........ B60K 15/067 |
| 2017/0282710 A1* | 10/2017 | Sloan .................. F17C 13/084 |
| 2017/0313179 A1 | 11/2017 | Sloan et al. |
| 2018/0080607 A1 | 3/2018 | Van Haaren et al. |
| 2018/0093563 A1* | 4/2018 | Matijevich ............ F17C 13/083 |
| 2018/0231182 A1* | 8/2018 | Posselt ................ F17C 3/04 |
| 2019/0077109 A1 | 3/2019 | Takemoto et al. |
| 2019/0107455 A1 | 4/2019 | Wortman et al. |
| 2019/0111609 A1 | 4/2019 | Van Nimwegen et al. |
| 2019/0170297 A1 | 6/2019 | Criel et al. |
| 2020/0072415 A1 | 3/2020 | Kamiya et al. |
| 2020/0088299 A1 | 3/2020 | Baumer et al. |
| 2020/0224823 A1 | 7/2020 | Hatta |
| 2020/0331536 A1 | 10/2020 | Sloan et al. |
| 2020/0347992 A1* | 11/2020 | Volkmer ............... B32B 27/304 |
| 2021/0088183 A1 | 3/2021 | Middendorf |
| 2021/0123565 A1 | 4/2021 | Kerforn et al. |
| 2021/0123568 A1 | 4/2021 | Kronholz et al. |
| 2021/0138717 A1 | 5/2021 | Iriyama |
| 2021/0310614 A1 | 10/2021 | Kamiya |
| 2022/0048380 A1* | 2/2022 | Yordanov ................ F17C 1/06 |
| 2022/0178495 A1* | 6/2022 | Volkmer ............... B32B 27/306 |
| 2022/0203825 A1* | 6/2022 | Volkmer ............... B32B 27/306 |
| 2023/0358365 A1* | 11/2023 | Yordanov ........ B60K 15/03006 |
| 2024/0044452 A1 | 2/2024 | Cederberg et al. |
| 2024/0263741 A1* | 8/2024 | Hakamata ......... B29C 45/14622 |
| 2024/0301997 A1* | 9/2024 | Perrier .................. F17C 1/02 |

FOREIGN PATENT DOCUMENTS

| | | |
|---|---|---|
| EP | 3 587 087 A1 | 1/2021 |
| JP | 3214783 | 10/2001 |
| JP | 6211308 | 10/2017 |
| JP | 2018-071122 | 5/2018 |
| KR | 20010002360 | 12/2001 |
| KR | 2014-0108345 | 9/2014 |
| WO | WO 2000/057102 A1 | 9/2000 |
| WO | WO 2007/110399 A2 | 10/2007 |
| WO | WO 2020/223666 A1 | 11/2020 |
| WO | WO 2022/235947 | 11/2022 |

OTHER PUBLICATIONS

International Search Report and Written Opinion in co-pending Application No. PCT/US2020/031104, dated Jul. 23, 2020 in 16 pages.
Office Action Dated Sep. 10, 2020, in U.S. Appl. No. 16/863,329, in 16 pages.
Amendment and Response to Office Action Dated Sep. 10, 2020, filed Dec. 9, 2020, in U.S. Appl. No. 16/863,329, in 13 pages.
Office Action Dated Dec. 28, 2020, in U.S. Appl. No. 16/863,329, in 14 pages.
Applicant-Initiated Interview Summary dated Feb. 23, 2021, in U.S. Appl. No. 16/863,329, in 6 pages.
Amendment and Response to Office Action Dated Dec. 28, 2020, filed Mar. 11, 2021, in U.S. Appl. No. 16/863,329, in 11 pages.
Office Action Dated Jun. 16, 2021, in U.S. Appl. No. 16/863,329, in 12 pages.
Applicant-Initiated Interview Summary dated Sep. 20, 2021, in U.S. Appl. No. 16/863,329, in 4 pages.
JEC Connect, "The new machine concept for the large-scale pressure vessel", Jun. 2021, in 4 pages.
Roth Composite Machinery GMBH, "Press release—Aerospace: Roth Filament Winding Plant for the manufacture of Ariane 6 boosters", Jun. 26, 2018, in 7 pages.

\* cited by examiner

POLYMERIC LINER BASED GAS CYLINDER WITH REDUCED PERMEABILITY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

Field

The present disclosure relates to gas cylinder assemblies having a barrier layer configured to reduce permeation of gas through the gas cylinder assemblies.

Related Art

Fuel tanks for compressed natural gas (CNG) may be categorized into four different types. The first type (Type 1) of CNG tank is an all-metal tank. An all-metal tank made of aluminum or other metals is inexpensive, but heavy and subject to corrosion. The second type (Type 2) of CNG tank is a tank that includes a metal liner and a reinforcement wrapping of a composite or a metal hoop. A Type 2 tank is lighter than the Type 1 but still subject to corrosion. The third type (Type 3) of CNG tank is a tank comprising a metal liner completely wrapped by a composite or fiber resin. A Type 3 tank is not subject to corrosion but is expensive. The fourth type (Type 4) of CNG tank is a tank comprising a polymer liner with a fiber wrapping. A Type 4 tank is not subject to corrosion and costs less than Type 3 tanks, and is the lightest for the volume of CNG that can be stored. Thus, a Type 4 tank is better suited for a fuel tank for a large vehicle. A Type 4 tanks suffer from a higher permeability of fuel gas than a tank having a metal liner.

SUMMARY

An aspect of the present invention provides a gas cylinder that has a polymeric liner and a low-permeability layer or barrier layer. Another aspect of the present invention provides a method of producing a gas cylinder assembly that has a low-permeability layer or barrier layer disposed over a polymeric liner.

In one embodiment, a gas cylinder for containing a pressurized gas (gaseous fuel) is provided. The gas cylinder includes an internal pressure enclosure that comprises a first end portion, a second end portion and a central body. The central body has a first end coupled with the first end portion of the internal pressure enclosure and a second end coupled with the second end portion of the internal pressure enclosure. The central body comprises an outer surface and an inner surface disposed between the first end and the second end. The first end portion, the second end portion, and the central body form an enclosed cavity for storing fuel. The inner surface of the central body forms at least a portion of an innermost surface of the internal pressure enclosure. The central body between the inner surface and the outer surface is a continuous expanse of a homogenous material. The gas cylinder comprises a reinforcement structure disposed, e.g., wound, over the central body. The gas cylinder further comprises a metal foil interposed between the reinforcement structure and central body. The metal foil is configured to reduce permeation of contents of the internal pressure vessel.

In some embodiments, the metal foil is an aluminum foil having a thickness greater than 0.001 inches. In some embodiments, the metal foil is an aluminum foil having a thickness in a range between 0.0005 in and 0.05 in. A metal foil in this thickness range provides a barrier to permeation, and can be applied without difficulty. Some embodiments are configured to allow for draping a layer, e.g., a metal foil over the central body. The metal foil can be a drapable layer. The metal foil can be draped over and directly onto the central body. The metal foil can be draped onto a layer or structure disposed between the draped foil and the central body. As used herein a drapable layer is a sheet layer that readily conforms to the surface the layer is applied to. Also, metal foils in this range do not significantly increase the weight of the gas cylinder in which they are incorporated.

In some embodiments, the gas cylinder further comprises an adhesive layer interposed between the metal foil and the central body.

In some embodiments, the metal foil comprises a portion of a metal foil structure comprising a polymer layer. The polymer layer of the metal foil structure is disposed on a side of the metal foil such that the polymer layer is interposed between the metal foil and the central body. In other embodiment, the polymer layer of the metal foil structure is disposed on a side of the metal foil such that the metal foil is interposed between the polymer layer and the central body. The metal foil can be disposed between two polymer layers. Polymer layers can be applied to the metal foil by a coating process. The metal foil can be subject to a surface treatments. These are examples of a processes that may improve the durability, provide electrical isolation, or protect the metal foil against corrosion.

In some embodiments, the central body comprises a cylindrical body. The first end portion can comprise a hemispherical member coupled with one end of the cylindrical body. The metal foil can be disposed over the cylindrical body.

In some embodiments, the metal foil is disposed over the cylindrical body and has a circumferential end that is spaced apart from the hemispherical member. In some cases, the metal foil is part of a permeation barrier layer that has one or more longitudinal ends that are disposed longitudinally between, e.g., spaced apart from, the hemispherical member of the internal pressure enclosure. In some cases, the metal foil is part of a permeation barrier layer that is disposed only between the first end and the second end of the central body.

In some embodiments, the metal foil is disposed in a laminate structure and is wound about the central body. In some embodiments, the metal foil is wound circumferentially about the central body.

In another aspect of the present disclosure, a pressure vessel assembly has an internal polymeric liner. The internal polymeric liner has a central portion and a dome end portion on each end of the central portion. The central portion has an inner surface, an outer surface and a wall disposed between the inner surface and the outer surface. The pressure vessel assembly further comprises a permeation barrier layer disposed over the central portion and, in some cases, on the dome end portions on at least one end of the central portion. In some cases, the pressure vessel assembly comprises a permeation barrier layer disposed over the central portion and not over the dome end portions on one or more ends of the central portion. The pressure vessel assembly further comprises a reinforcing layer comprising flexible ribbon material disposed over the permeation barrier.

In some embodiments, the permeation barrier layer comprises a metal layer disposed over the outer surface of the central portion and on an outer surface of each of the dome end portions.

In some embodiments, the permeation barrier layer comprises a metal sheet, e.g., a film, with overlapping longitudinal edges disposed over the outer surface of the central portion. The metal film can be disposed on an outer surface of each of the dome end portions in some embodiments.

In some embodiments, the permeation barrier layer comprises a polymeric layer comprising EVOH disposed over the outer surface of the central portion. The layer comprising EVOH can be disposed on an outer surface of each of the dome end portions in some embodiments.

In some embodiments, the permeation barrier layer comprises a first configuration disposed over the central portion and a second configuration disposed over an outer surface of one or each of the dome end portions. The second configuration can be different from the first configuration.

In some embodiments, the permeation barrier layer comprises an elongate strip disposed over the central portion of the internal polymeric liner. The strip have a longitudinal axis aligned with the longitudinal axis of the permeation barrier layer. The strip can have a longitudinal axis disposed circumferentially about the permeation barrier layer. The strip can include a metal layer and, optionally, one or more polymer layers on one or more sides of the metal layer. An adhesive can be provided on one or more sides of the strip before or after the strip is applied to the liner or internal pressure enclosure.

In some embodiments, the permeation barrier layer comprises a plurality of elongate strips that are in contact with an exterior surface of the polymeric liner or internal pressure enclosure.

In another embodiment a method is provided for producing a gas cylinder. The method comprises (1) providing a polymeric cylinder comprising an inner circumferential surface and an outer circumferential surface, the inner circumferential surface providing at least a portion of an innermost surface of the gas cylinder, (2) forming a permeation barrier layer over the outer circumferential surface, the permeation barrier layer having a thickness sufficient to limit permeation, e.g., greater than 0.0002 in, (3) providing a first dome-shaped member having a first opening and a second dome-shape member having a second opening, (4) securing the first dome-shape member to the first end of the polymeric cylinder and securing the second dome-shape member to the second end of the polymeric cylinder to obtain a low permeation vessel having a central portion having an outer surface defined by the permeation barrier layer, and (5) winding one or more strips of a reinforcing member over the permeation barrier layer to form an outer shell of the gas cylinder.

In some embodiments, forming the permeation barrier layer comprises wrapping one or more metal foils over the outer circumferential surface. The metal foil has a thickness in a range between 0.0005 in to 0.05 in. The metal foils can be wrapped circumferentially over the outer circumferential surface.

In some embodiments, forming the permeation barrier layer comprises depositing a metallic layer by a vapor deposition process. In certain embodiments, forming the permeation barrier layer applying strips of a metal-coated film longitudinally over the outer surface of the polymeric cylinder.

In some embodiments, the permeation barrier layer is a first permeation barrier layer and the method of producing the gas cylinder further comprises disposing a second permeation barrier layer on the first dome portion and/or the second dome portion. The second permeation barrier layer can have a different configuration from the first permeation barrier layer.

In some embodiments, a gas cylinder assembly comprises an internal polymeric liner comprising an inner surface and an outer surface, a metal foil structure disposed over the inner surface or the outer surface of the liner. The gas cylinder assembly further comprises a reinforcing layer comprising flexible ribbon material disposed wound over the internal polymeric liner and the metal foil structure. The reinforcing layer comprising flexible ribbon material can be disposed directly on the metal foil structure in some embodiments. In certain embodiments, the internal polymeric liner comprises a single layer of a single material disposed between the inner surface and the outer surface of the liner.

BRIEF DESCRIPTION OF THE DRAWINGS

Features of the invention can be better understood from the following detailed description when read in conjunction with the accompanying schematic drawings, which are for illustrative purposes only. The drawings include the following figures.

DETAILED DESCRIPTION

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Figure 1:
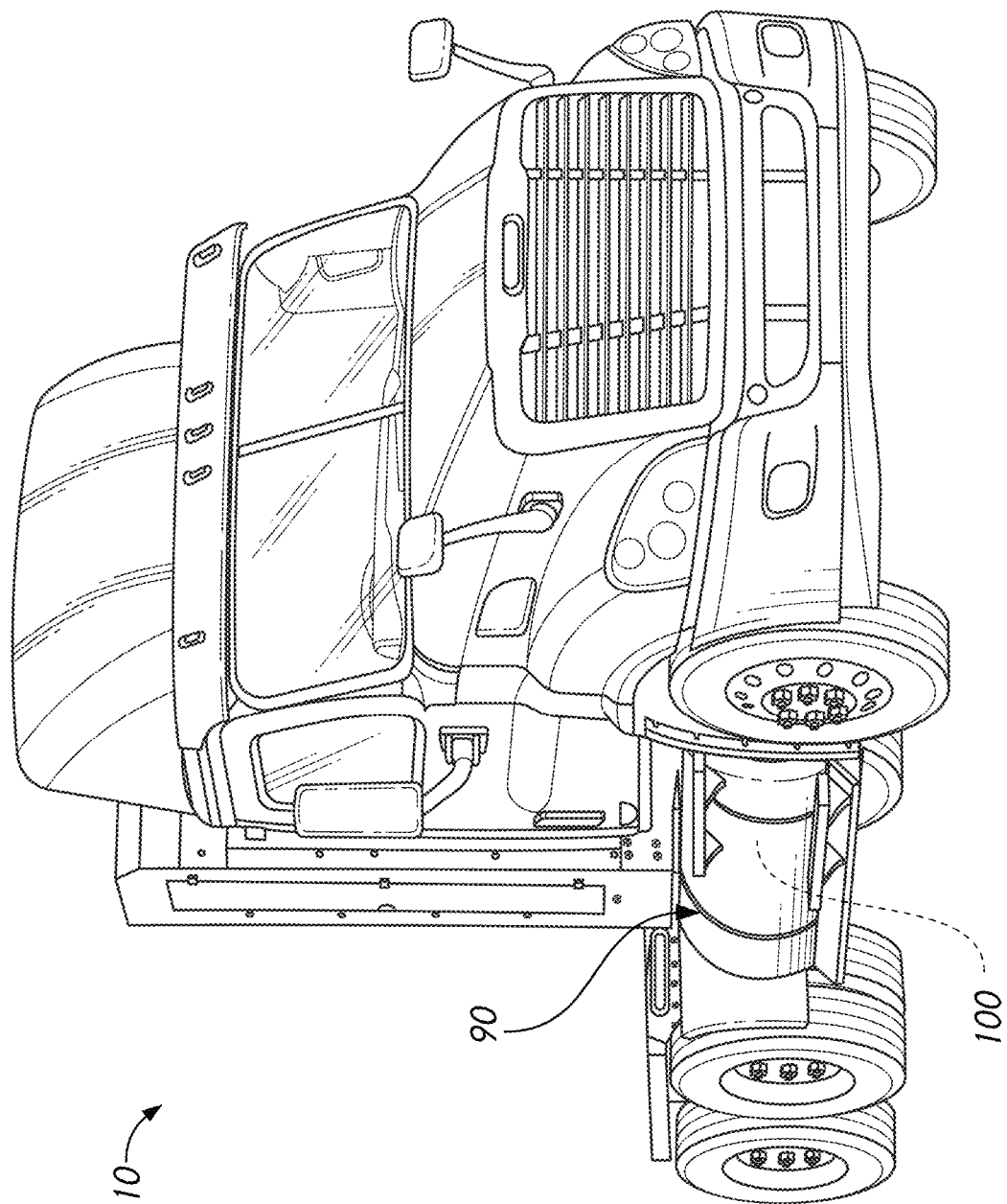
FIG. 1 shows a vehicle that has a gas cylinder assembly according to one embodiment integrated into a side-mount fuel system.

This application discloses novel gas cylinder assemblies and methods of producing gas cylinder assemblies. As used herein "cylinder" is a term that includes storage tanks, pressure vessels and other containers that can be used to store a gas and is not necessarily limited to a specific shape such as a right cylinder and/or having a constant or unvarying circular shape in cross-section. FIG. 1 show a fuel system 90 that includes a gas cylinder assembly 100 installed on a vehicle 10 according to an embodiment. The gas cylinder assembly 100 is in fluid communication with and supplies fuel to an engine or any other power generation system of the vehicle 10. In various embodiments, the vehicle 10 may be a car, a wagon, a van, a bus, a high-occupancy vehicle, a truck, a tractor trailer truck, a heavy duty vehicle such as a garbage truck or any other vehicle. In various embodiments, a gas cylinder assembly 100 is configured for use in a ship, an airplane and a mobile or stationary fuel station. The illustrated fuel system 90 is a side-mounted system in which one gas cylinder (fuel tank) is disposed in a housing. The gas cylinder assemblies 100 disclosed herein can used in fuel systems with more than one gas cylinder assembly which can be configured for placement behind the cab of the vehicle, on a rooftop and/or mounted to a tailgate of a vehicle.

Structure of Gas Cylinder Assemblies

Figure 2:
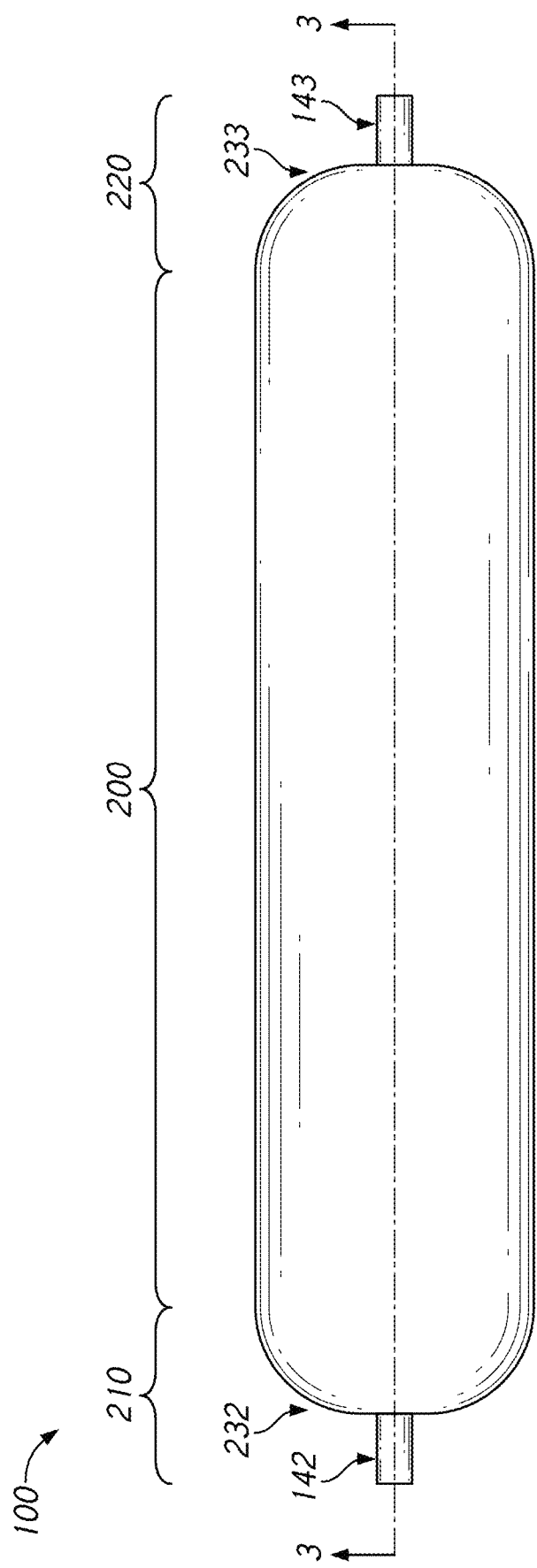
FIG. 2 is a side view of a gas cylinder assembly according to one embodiment.
Figure 3:
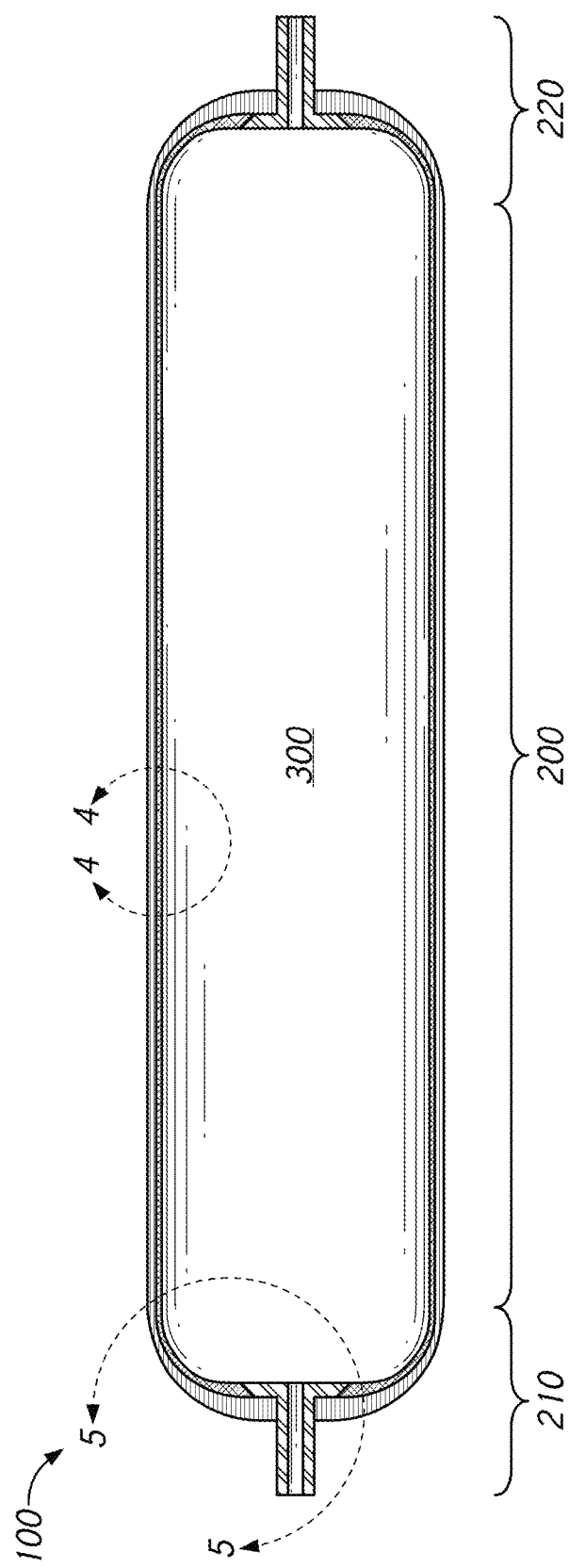
FIG. 3 is a cross-sectional view of the gas cylinder assembly of FIG. 2 taken at section plane 3-3.

FIGS. 2 and 3 show that the gas cylinder assembly 100 comprises a central portion 200 and two end portions 210, 220. The central portion 200 can be of a cylindrical tubular shape. In other embodiments, the central portion is of a shape other than a cylinder. In some embodiments, each of the two end portions 210, 220 includes a dome structure 232, 233 as shown in FIG. 2. In certain embodiments, the two end portions are symmetrical to each other. The dome structure 232, 233 can be generally hemispherical at least at the end portions thereof. In certain embodiments, two end portions 210, 200 have different shapes such that the gas cylinder assembly 100 is of an asymmetrical shape.

In some embodiments, the gas cylinder assembly 100 comprises at least one neck 142, 143 (e.g., a longitudinal projection of a boss) that provides an inlet and/or an outlet of an internal volume of the gas cylinder assembly 100. In some embodiments, the gas cylinder assembly 100 comprises necks 142, 143 formed at both of the end portions 210, 220. In certain embodiments, a neck can be formed only one of the two end portions 210, 200. In some embodiments, the neck 142, 143 can be part of a metallic structure, sometimes referred to as a boss, that is formed through a first end portion 124 of an internal pressure enclosure 120, which is sometimes referred to as an inner liner assembly or simply a liner of the gas cylinder assembly 100. The internally pressure enclosure 120 is discussed below in connection with FIGS. 6-7.

Although the neck 142, 143 can be made of a metallic structure, the neck 142, 143 can be made of one or more other materials. In certain embodiments, the neck 142, 143 is formed using one or more materials not used for the internal pressure enclosure 120. In certain embodiments, the neck 142 is made of the same material as the internal pressure enclosure 120.

Figure 4:
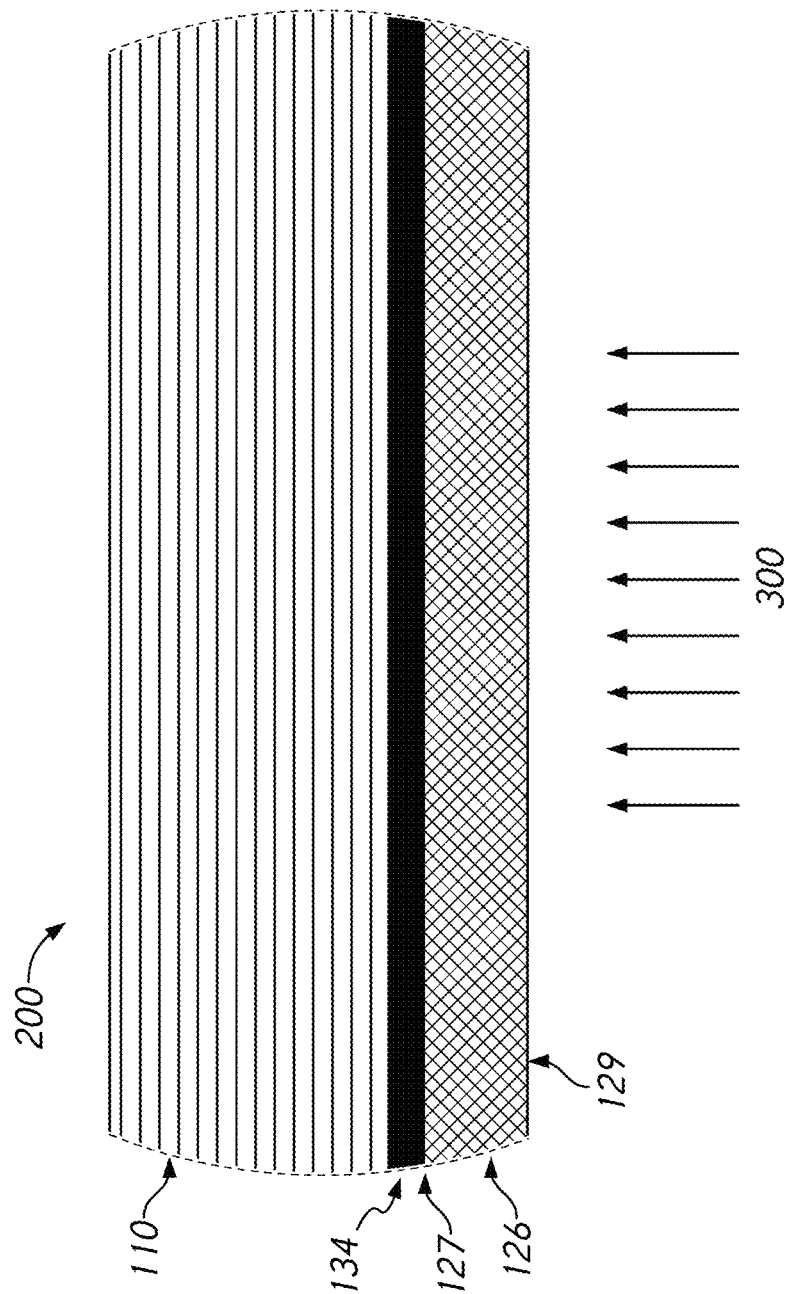
FIG. 4 is an enlarged view of detail 4-4 in FIG. 3 showing the structure of a central portion of the tank gas cylinder assembly of FIG. 2.

FIGS. 3 and 4 shows that the gas cylinder assembly 100 can include multiple layers that are provided for distinct functions. As noted above and discussed more fully below the internal pressure enclosure 120, which itself can be an assembly, primarily provides an internal space 300 (enclosed cavity) for containing fuel. A reinforcement structure 110 (e.g., an outer shell) is disposed over the internal pressure enclosure 120 to provide additional strength to the gas cylinder assembly 100. The strength provided by the reinforcement structure 110 supports the gas cylinder assembly 100 when the tank assembly is pressurized (as indicated by the arrows in FIG. 4). FIG. 4 shows that the central portion 200 of the tank gas cylinder assembly 100 can have a further layered structure.

In the region shown in FIG. 4, a central body 126 of the internal pressure enclosure 120 is the innermost layer of the layered structure. The inner surface 129 of the central body 126 defines at least a portion of the internal space 300 of the gas cylinder assembly 100.

In some embodiments, the central body 126 and dome end portions (dome structures) 162, 163 of the internal pressure enclosure 120 are constructed using one or more polymeric materials. The one or more polymeric materials can be selected, in certain embodiments, from nylon, high density polyethylene (HDPE), polyvinyl chloride (PVC), ethylene propylene diene terpolymer (EDPM), polyethylene terephthalate (PET) and polyketone (POK). Processes to build the internal pressure enclosure (inner liner) 120 will be discussed below in connection with FIGS. 6-7.

In some embodiments, in the region shown in FIG. 4, the central body 126 of the internal pressure enclosure 120 has a thickness of 0.01, 0.02, 0.03, 0.05, 0.08, 0.09, 0.1, 0.12, 0.13, 0.15, 0.18, 0.19, 0.2, 0.21, 0.23, 0.25, 0.28, 0.29, 0.30 inches. In embodiments, the central body 126 has a thickness in a range formed by any two numbers selected from those listed in the proceeding sentence such that the central body 126 is stiff enough for further processing (e.g. to support a compression load applied in winding of a carbon fiber material over the body 126). In other embodiments, the central body 126 has a thickness greater than 0.30 inches. In other embodiments, the central body 126 has a thickness less than 0.01 inches. In some embodiment, the central body 126 has a thickness of about 0.10 inches or greater when it is made of nylon. In some embodiment, the central body 126 has a thickness of about 0.18 inches or greater when it is made of HDPE.

Over the central body 126 of the internal pressure enclosure 120, a permeation barrier layer 134 is disposed to lower permeation of fuel from the internal space 300 through the central portion 200 of the gas cylinder assembly 100. In embodiments, as discussed further below, a portion of the gas cylinder assembly 100 other than the central portion 200 also can have the same or similar layered structure. For example, the end portions 210, 220 can have, at least in part, a similar layered structure.

FIGS. 3 and 4 show that in some embodiments the permeation barrier layer 134 is interposed between the internal pressure enclosure 120 and the reinforcing structure 110. The permeation barrier layer 134 can be immediately adjacent to and contacting the central body 126 of the internal pressure enclosure 120 (e.g., the outer surface 127 thereof). In other embodiments, one or more additional layers can be interposed between the permeation barrier layer 134 and the central body 126, as discussed further below. In certain embodiments, the permeation barrier layer can be disposed at or on the inner surface 129 of the central body 126.

In certain embodiments, the permeation barrier layer 134 is immediately adjacent to and contacting the outer reinforcement structure 110. The permeation barrier layer 134 can be immediately adjacent to and contacting both the outer surface 127 of the central body 126 and an inner surface of the outer reinforcement structure 110. In other embodiments, one or more additional layers can be interposed between the permeation barrier layer 134 and the outer reinforcement structure 110.

In some embodiments, the permeation barrier layer 134 comprise one or more low-permeability barrier materials. The one or more low-permeation barrier materials can be selected, in certain embodiments, from a metal (e.g. aluminum, tungsten, stainless steel), a metal alloy, a metallic compound (e.g. aluminum oxide, titanium), polyvinylidene chloride (PVDC), ethylene vinyl alcohol (EVOH), polyamide, and polyethylene terephthalate (PET). In certain embodiments, the foil may be of any metal that can be configured to provide a homogeneous continuous layer of metal that is impermeable to gas. More preferred materials will also be light weight and low cost. Aluminum foil is one preferred example. Processes to place the permeation barrier layer 134 over the internal pressure enclosure 120 will be discussed below in connection with FIGS. 8-18.

In some embodiments, in the region shown in FIG. 4, the permeation barrier layer 134 has a thickness of 0.0001, 0.0002, 0.0003, 0.0004, 0.0005, 0.0006, 0.0007, 0.0008, 0.0009, 0.001, 0.002, 0.003, 0.005, 0.009, 0.01, 0.02, 0.05, 0.09, 0.1 inches. In some embodiments, the permeation barrier layer 134 has a thickness in a range formed by any two numbers selected from those listed in the proceeding sentence. In other embodiments, the permeation barrier layer 134 has a thickness greater than 0.1 inches. In other embodiments, the permeation barrier layer 134 has a thickness less than 0.0001 inches.

In some embodiments, in the region shown in FIG. 4, the permeation barrier layer 134 comprise a metal foil layer that has a thickness of 0.0001, 0.0002, 0.0003, 0.0004, 0.0005, 0.0006, 0.0007, 0.0008, 0.0009, 0.001, 0.002, 0.003, 0.005, 0.009, 0.01, 0.02, 0.05, 0.09, 0.1 inches. In some embodiments, the permeation barrier layer 134 has a thickness in a range formed by any two numbers selected from those listed in the proceeding sentence. In other embodiments, the permeation barrier layer 134 has a thickness greater than 0.1 inches. In other embodiments, the permeation barrier layer 134 has a thickness less than 0.0001 inches. The permeation barrier layer 134 can be configured to allow for draping over a structure disposed inward thereof. The permeation barrier layer can be a metal foil that is drapable. The permeation barrier layer 134 can be draped over and directly onto the central body 126. If configured as a metal foil, the barrier layer 134 can be draped such that a metal surface is directly on the central body 126 or is directly on a structure disposed between the draped foil and the central body. As used herein a drapable layer is a sheet layer that readily conforms to the surface to which the layer is applied.

In some embodiments, a metal foil layer, during its manufacturing or handling process, may be susceptible to minute pinholes when it is thinner than 0.001 inches. Pinholes of the metal foil layer may increase permeability of fuel gas. Accordingly, in some embodiments, an additional coating can be applied to plug pinholes of the meatal foil in providing the permeation barrier layer 134.

In some embodiments, in the region shown in FIG. 4, the reinforcement structure 110 has a thickness of 0.05, 0.1, 0.2, 0.3, 0.4, 0.5, 0.6, 0.7, 0.8, 0.9, 1, 1.2, 1.5 or 2.0 inches. In some embodiments, the reinforcement structure 110 has a thickness in a range formed by any two numbers selected from those listed in the proceeding sentence. In other embodiments, the reinforcement structure 110 has a thickness greater than 2.0 inches. In other embodiments, the reinforcement structure 110 has a thickness less than 0.05 inches.

In some embodiments, in the region shown in FIG. 4, the permeation barrier 134 layer has a thickness that is substantially thinner than that of the central body 126. When the permeation barrier layer 134 comprises a metal layer and has a density greater than that of the central body 126, having a thinner permeation barrier can be advantageous to reduce the total weight of the gas cylinder assembly. In some embodiments, the permeation barrier 134 has a thickness of 0.1, 1, 2, 3, 4, 5, 6, 7, 8, 9, 10, 12, 14, 16, 18, 20, 22, 24, 26, 28 or 30% of that of the central body 126. In some embodiments, the permeation barrier layer 134 has a thickness, expressed as a percent of the thickness of the central body 126, in a range formed by any two numbers selected from those listed in the proceeding sentence. In other embodiments, the permeation barrier layer 134 has a thickness over 30% of that of the central body 126. In other embodiments, the permeation barrier layer 134 has a thickness less than 0.1% of that of the central body 126.

In some embodiments, because the permeation barrier layer 134 does not bring a significant increase in the total weight of the gas cylinder assembly 100, the gas cylinder assembly 100 has a better (lower) permeability than a Type 4 CNG tank while maintaining a weight per unit containing volume comparable to that of a Type 4 CNG tank (e.g. 0.3 to 0.45 kg/L).

In some embodiments, the gas cylinder assembly 100 has a weight per unit containing volume of 0.1, 0.2, 0.25, 0.3, 0.35, 0.4 or 0.45 kg/L. In some embodiments, the gas cylinder assembly 100 has a weight per unit containing volume in a range formed by any two numbers selected from those listed in the proceeding sentence. In some embodiments, the gas cylinder assembly 100 has a weight per unit containing volume less than 0.1 kg/L. In other embodiments, the gas cylinder assembly 100 has a weight per unit containing volume greater than 0.45 kg/L.

In some embodiments, the reinforcement structure 110 is constructed using a composite material. In certain embodiments, the reinforcement structure 110 comprises a layer of a fiber-reinforced composite material (e.g. carbon-fiber reinforced polymer resin) In certain embodiments, a material other than composite materials discussed above can be used to form the reinforcement structure 110.

Figure 5:
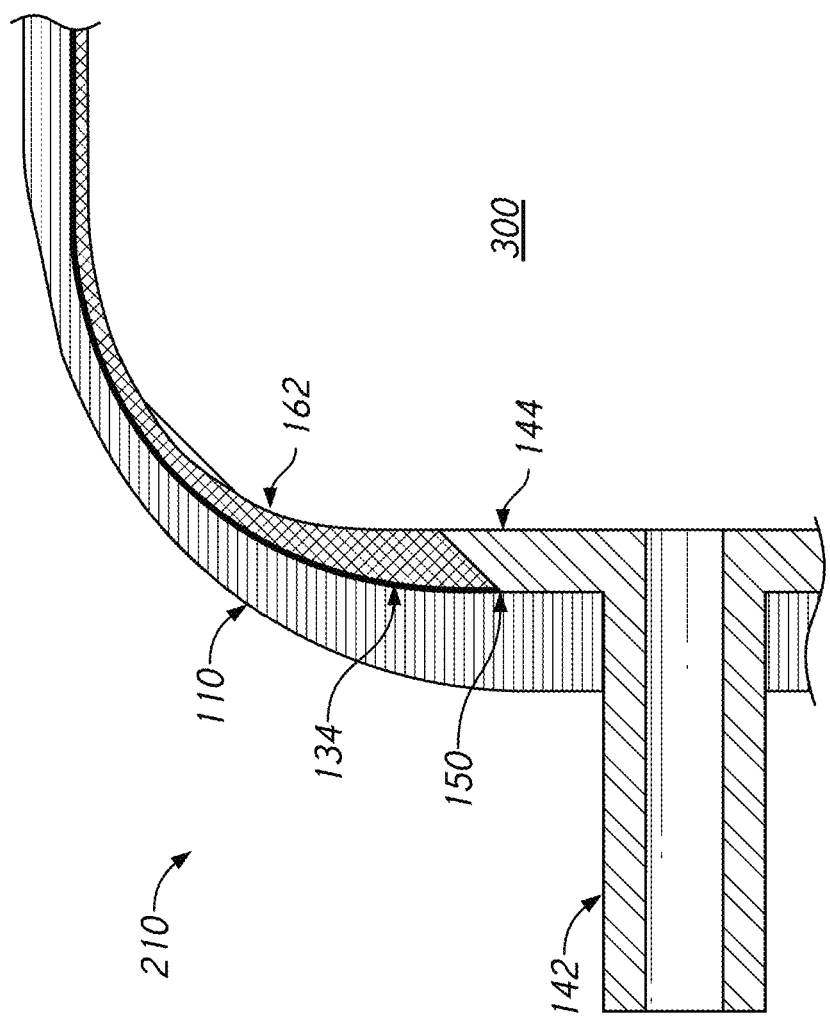
FIG. 5 is an enlarged view of detail 5-5 in FIG. 3 showing the structure of an end portion of the tank gas cylinder assembly of FIG. 2.

FIG. 5 shows that the end portion 210 of the tank gas cylinder assembly 100 can have a layered structure. A first end portion 124 of the internal pressure enclosure 120 is provided in the end portion 210 of the gas cylinder assembly 100. The first end portion 124 of the internal pressure enclosure 120 includes an assembly of a first dome end portion (dome structure) 162 and a first boss 144 that comprises a neck portion 142. The first dome end portion 162 and the first boss 144 in combination provide the innermost part of the end portion 210 and define at least a portion of the internal space 300 of the tank gas cylinder assembly 100.

FIGS. 2-5 show that in embodiments, the permeation barrier layer 134 is disposed over the entirety of the first dome end portion 162 within the first end portion 210 up to but not including over the boss 144. In some embodiments, the permeation barrier 134 extends over the boundary between the inner liner 124 and the boss 144 and can extend over the boss 144 as well. In certain embodiments, the permeation barrier 134 does not extend over the boundary 150 between the inner liner 124 and the boss 144. In other embodiments, the permeation barrier 134 extend over the boundary 150 to cover at least a portion of the boss 144.

Methods of Producing Gas Cylinder Assemblies

In some embodiments, a method of producing the gas cylinder assembly 100 includes: (1) forming the internal pressure enclosure 120 of FIG. 6, (2) forming the permeation barrier layer 134 over at least a portion of the internal pressure enclosure 120 or on at least a portion of an inside surface thereof to form an intermediate assembly 130 of FIG. 8, and (3) subsequently forming the reinforcement structure 110 over the permeation barrier layer 134.

In some embodiments, the central body 126 of the internal pressure enclosure 120 can be produced by forming a cylindrical tube, e.g., by rolling a polymer sheet into a cylindrical tubular body. In other embodiments, the central body 126 can be produced using other processes including injection molding and extrusion.

In some embodiments, the first end portion 124 of the internal pressure enclosure 120 can be prepared by (a) forming a first dome shaped member 162 of a polymer material using an injection molding process, (b) forming a central hole through the first dome shaped member to form the first dome end portion 162, and (c) coupling a boss 144 to the first dome end portion 162 through the central hole. The second dome shaped member 163 and the second end portion 125 can be prepared using the same or similar layered processes.

In certain embodiments, forming the first dome shaped member and forming the central hole can be done at the same time in a single process of injection molding. In some embodiments, a process other than injection molding can be used to build the first dome shaped member 162. In some embodiments, the first dome shaped member 162 is a hemispherical member having a central opening therethrough.

Figure 6:
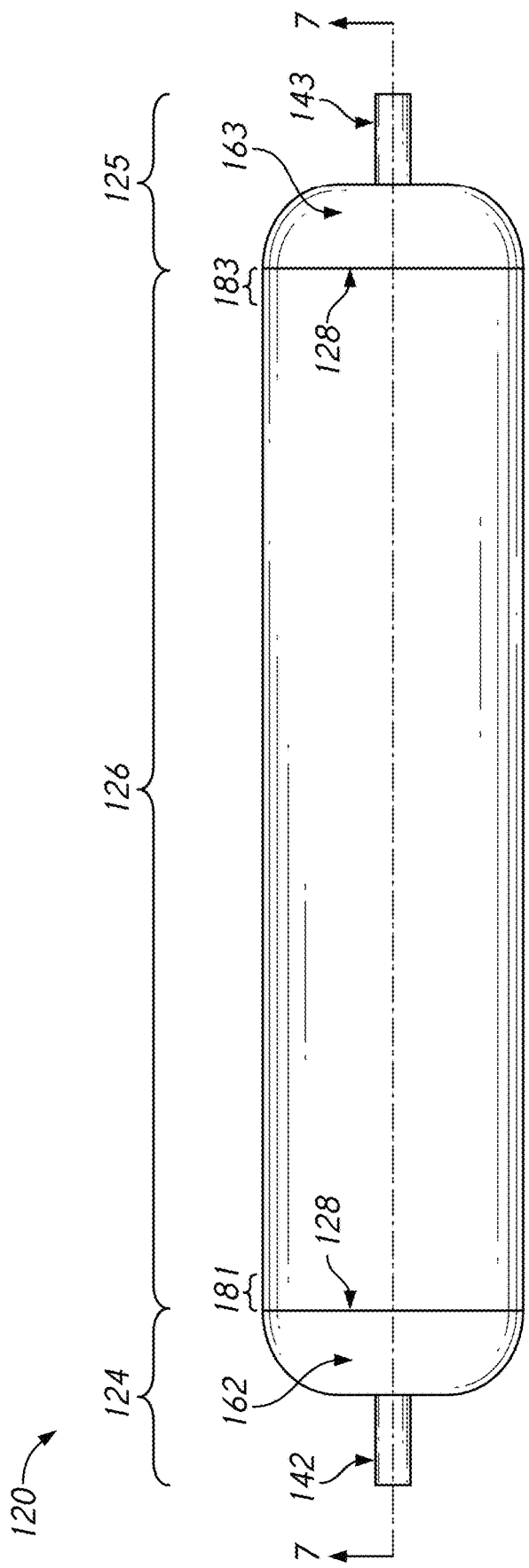
FIG. 6 shows an internal pressure enclosure of a gas cylinder assembly according to one embodiment.
Figure 7:
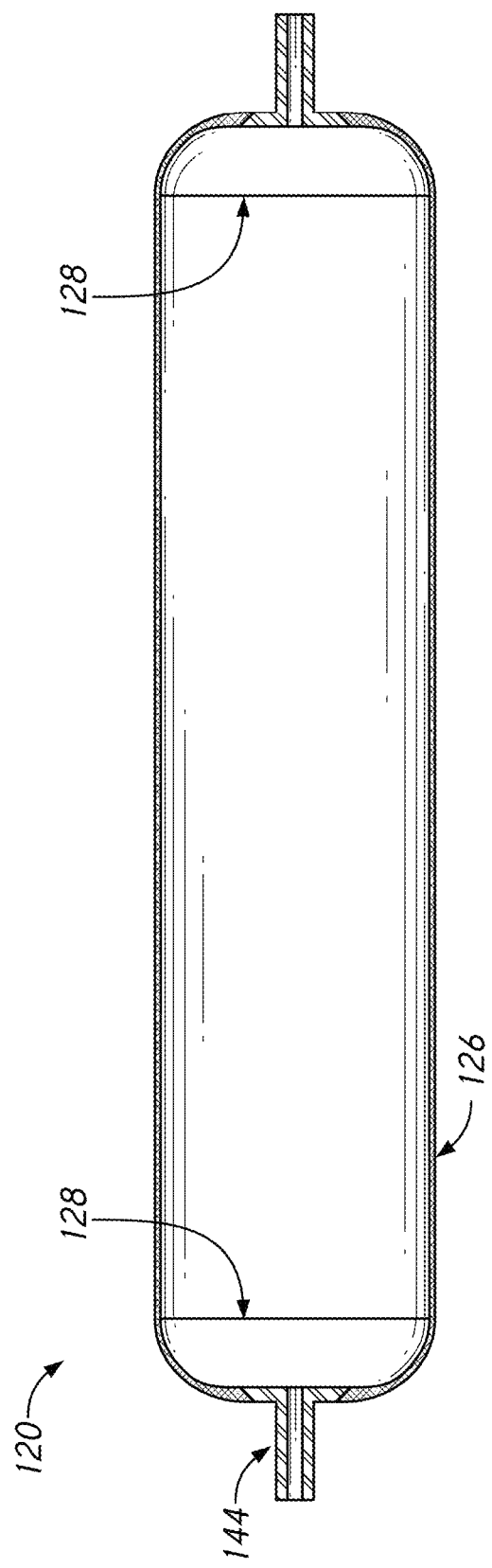
FIG. 7 is a cross-sectional view of the internal pressure enclosure of FIG. 6 taken at section plane 7-7.
Figure 8:
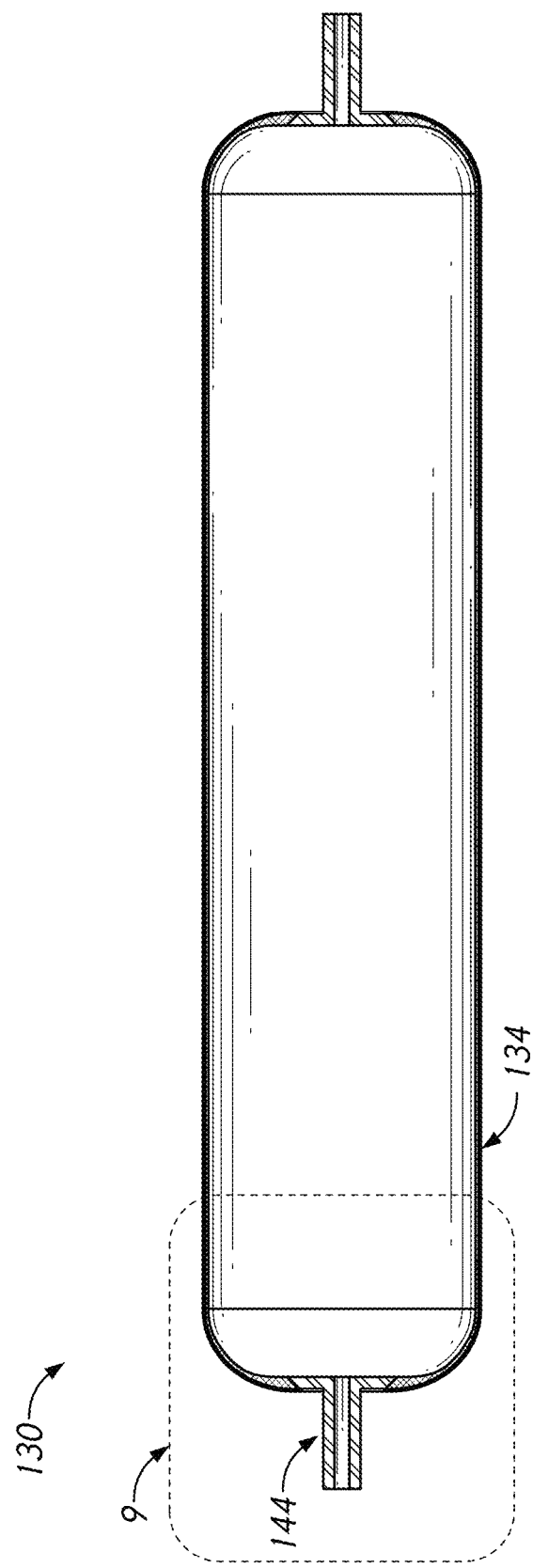
FIG. 8 is a cross-sectional view of an assembly including a barrier layer disposed over the internal pressure enclosure of FIG. 6.
Figure 9:
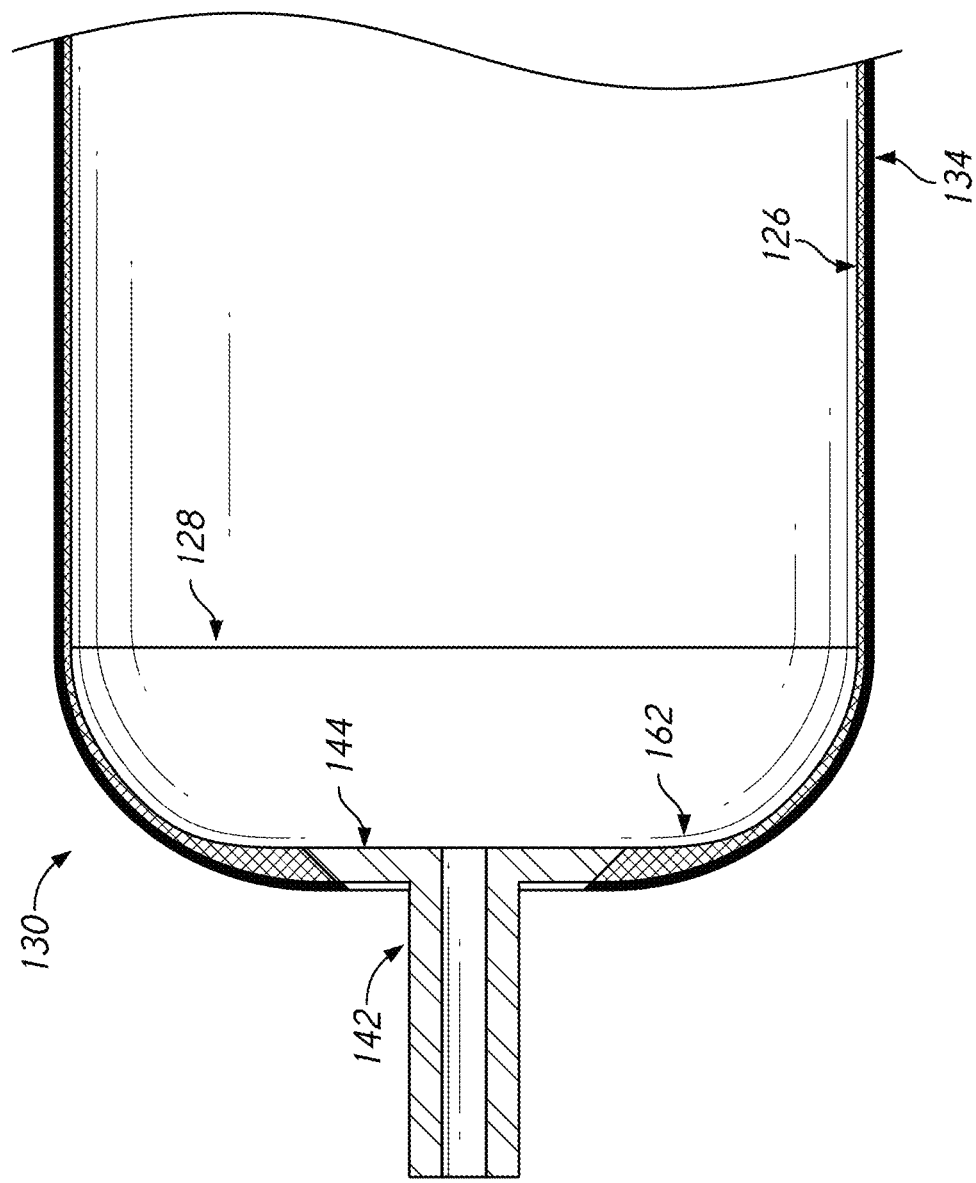
FIG. 9 is an enlarged view showing detail 9 of the assembly of FIG. 8.

After the central body 126 and the end portions 124, 125 are produced, to form the internal pressure enclosure 120, a first end 181 of the central body 126 is coupled with the first end portion 124 and a second end 183 of the central body 126 is coupled with the first end portion 125. In certain embodiments, a welding process can be used to couple the central body 126 and the end portions 124, 125 and can leave a weld line 128 along the boundary between the central body 126 and the two end portions 124, 125 as shown in FIGS. 6 and 7. In some embodiments, the central body 126 and the end portions 124, 125 are fixed to each other using an adhesive material.

In some embodiments, after the internal pressure enclosure 120 is prepared, a permeation barrier layer 134 is formed over the internal pressure enclosure 120 to obtain an intermediate assembly 130. In embodiments of FIGS. 8 and 9, the permeation barrier layer 134 covers the central body 126 and at least a portion of the end portions 124, 125. For example, the permeation barrier layer 134 covers the entirety of the central body 126 and further coves the dome end portion 162 up to and/or including the boss 144.

In some embodiments, the permeation barrier layer 144 is provided by applying one or more strips of a barrier material on an outer surface of the internal pressure enclosure 120. In other embodiments, a barrier material is painted or sprayed over an outer surface of the internal pressure enclosure 120 (metallizing process). In some embodiments, a barrier material is deposited using a vapor deposition process. In certain embodiments, wrapping a metal foil over the internal pressure enclosure 120 is preferred over a metallizing process. Without being limited to any particular theory it is believed that a continuous expanse of metal in the metal foil may provide a better (lower) permeability than a coating of a thickness or volume formed by the metallizing process. In certain embodiments, a process other than those discussed above can be used to form a permeation barrier layer. Various processes to form a permeation barrier layer will be describe below in more detail.

Figure 10:
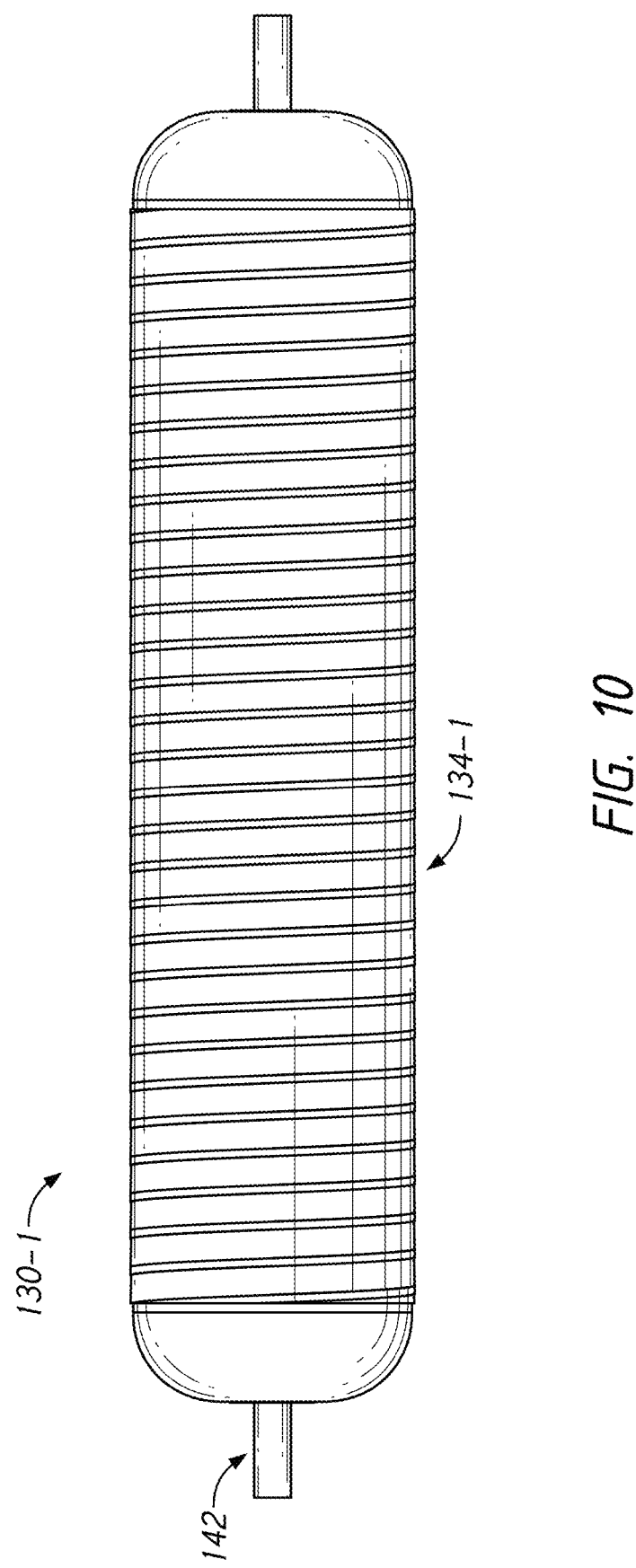
FIG. 10 shows an embodiment of a gas cylinder assembly having a barrier layer material in the form of a strip or strips wound or wrapped circumferentially around the internal pressure enclosure of FIG. 6 and also illustrates a process of wrapping or winding a strip or strips such that a longitudinal axis of the strip is disposed generally transverse to a longitudinal direction of the internal pressure enclosure.

FIG. 10 shows that in one embodiment one or more strips (e.g., tapes, ribbons) of barrier material 134-1 are wound over the internal pressure enclosure 120 and along a circumferential direction of the internal pressure enclosure 120 to form a permeation barrier layer of an intermediate assembly 130-1. The strips can be applied generally transverse to the longitudinal direction of the enclosure 120. In some embodiments, two neighboring windings of the barrier material strip(s) 134-1 overlap each other such that a portion of the permeation barrier layer 134-1 is thicker than another portion. In embodiments, windings of the barrier material strip(s) 134-1 cover, e.g., go over, the weld line 128 along a longitudinal direction of the intermediate assembly to 130-1 such that the barrier material strip 134-1 is disposed over the weld line 128. The barrier material strip(s) 134-1 can also go over the dome end portion 162 of the internal pressure enclosure 120. In certain embodiments, windings of the barrier material strip(s) 134-1 remain between the weld lines 128 such that the dome end portion 162 is not covered by the barrier material strip(s) 134-1.

Figure 11:
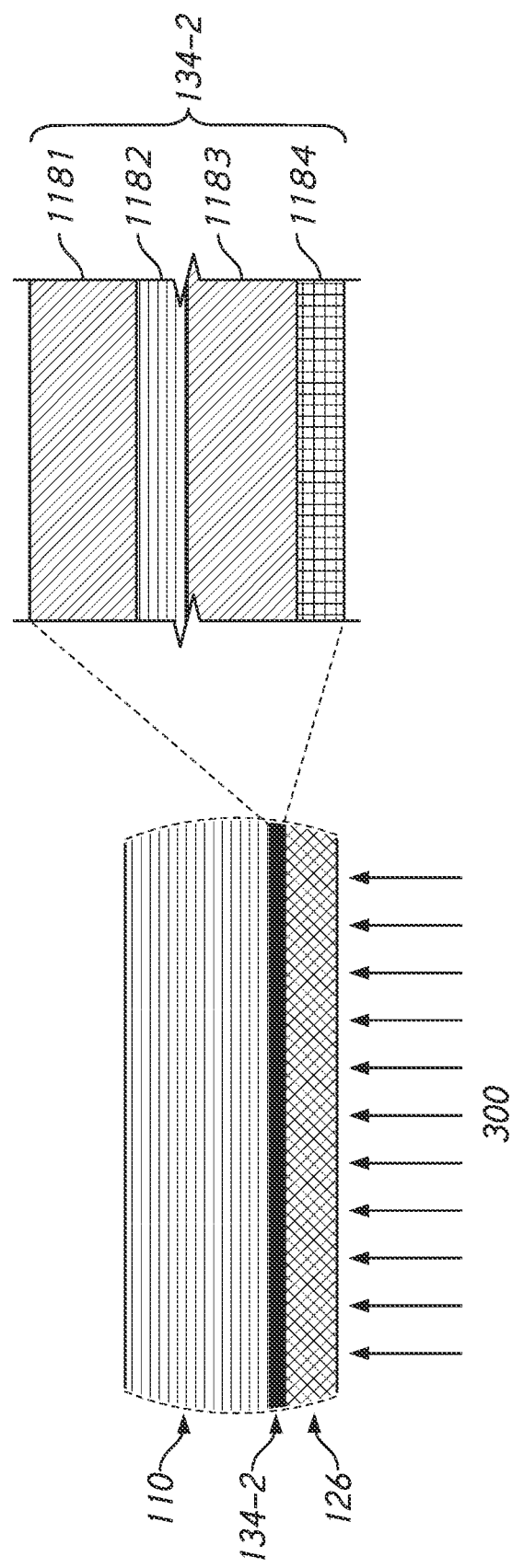
FIG. 11 is an enlarged partial cross-sectional view, similar to FIG. 4, of a central portion of a gas cylinder and also showing layers of a permeation barrier structure according to one embodiment.

FIG. 11 shows that in some embodiments a permeation barrier layer 134-2 interposed between the enclosure 120 and the structure 110 comprises a multi-layer member or members. In some embodiments, the permeation barrier layer 134-2 comprises a metal foil 1182, a first polymer layer 1181 and a second polymer layer 1183. The permeation barrier layer 134-2 can also include an adhesive layer 1184 in some variations. In some embodiments, the permeation barrier layer 134-2 does not have at least one of the first polymer layer 1181 and the second polymer layer 1183 [183]. In some embodiments, the permeation barrier layer 134-2 does not have the adhesive layer 1184. In certain embodiments, the permeation barrier layer 134-2 excludes the metal foil 1182 and includes at least one of the polymer layers 1181, 1183. In certain embodiments, a metal foil 1182 with no additional layer can be directly wrapped over an outer surface 126 of the internal pressure enclosure 120 to form a permeation barrier. The reinforcement structure 110 can be applied directly on the permeation barrier layer 134-2, e.g., directly on one of the polymer or adhesive layers or directly on the metal foil layer. The reinforcement structure 110 can be applied directly on the metal foil 1182 of variations of the permeation barrier layer 134-2, e.g., on variations in which the first polymer layer 1181 is not present. In some variations, direct contact is provided between the metal foil 1182 and the reinforcement structure 110. In some variations, direct contact is provided between the metal foil 1182 and the internal pressure enclosure 120. In some variations direct contact is provided between the internal pressure enclosure 120 the metal foil 1182 and/or between the reinforcement structure 110 and the metal foil 1182. In some embodiments, the first polymer layer 1181 is a polymer layer comprising ethylene vinyl alcohol (EVOH). In some embodiments, the second first polymer layer 1183 is a polymer layer comprising ethylene vinyl alcohol (EVOH). In certain embodiments, a permeation barrier layer does not comprises a metal foil layer, but comprise a layer of low-permeability ethylene vinyl alcohol (EVOH).

Figure 12:
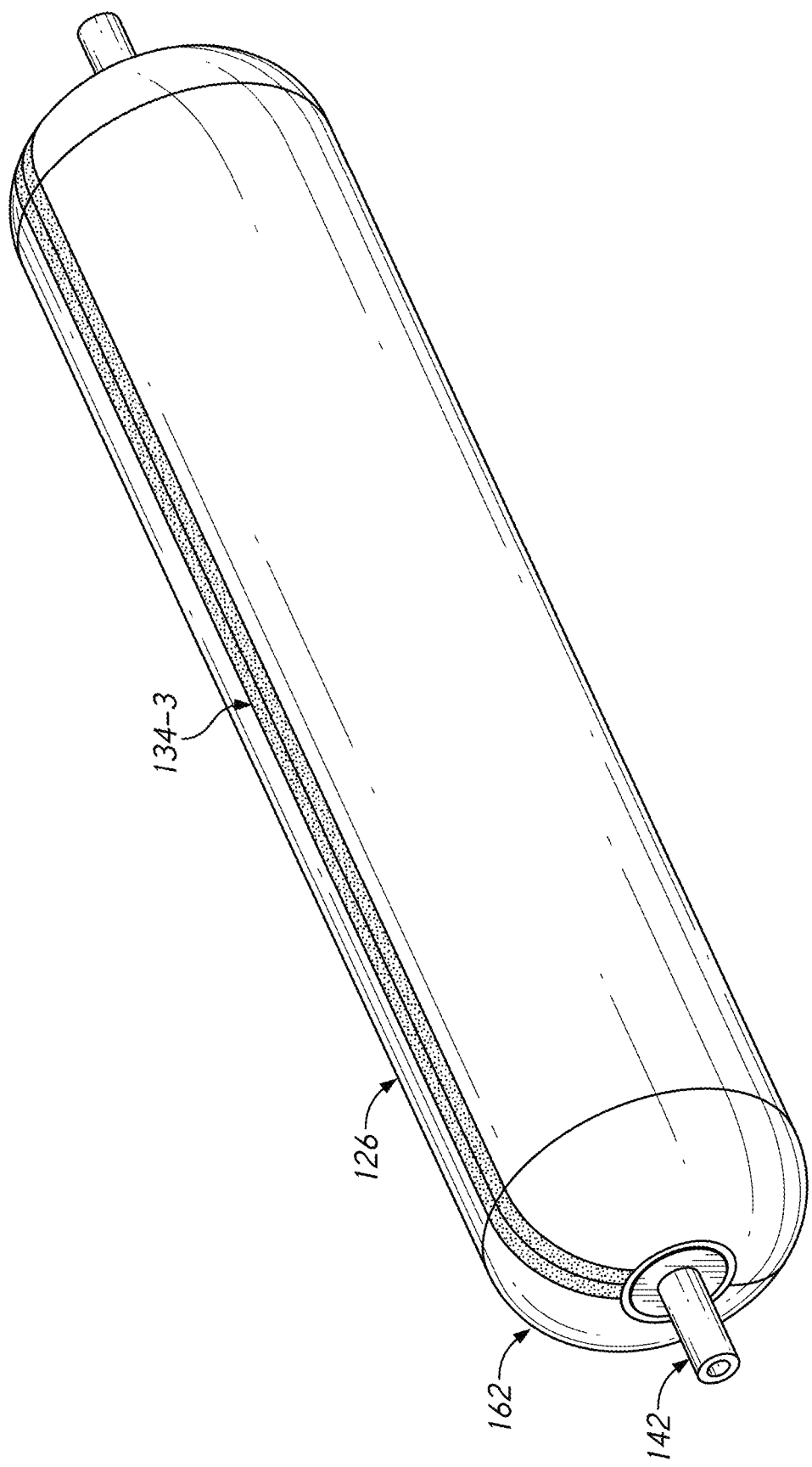
FIG. 12 illustrates a process of attaching a strip of a barrier layer material over the internal pressure enclosure of FIG. 6, a longitudinal axis of the strip aligned with a longitudinal direction of the internal pressure enclosure according to one embodiment.
Figure 13:
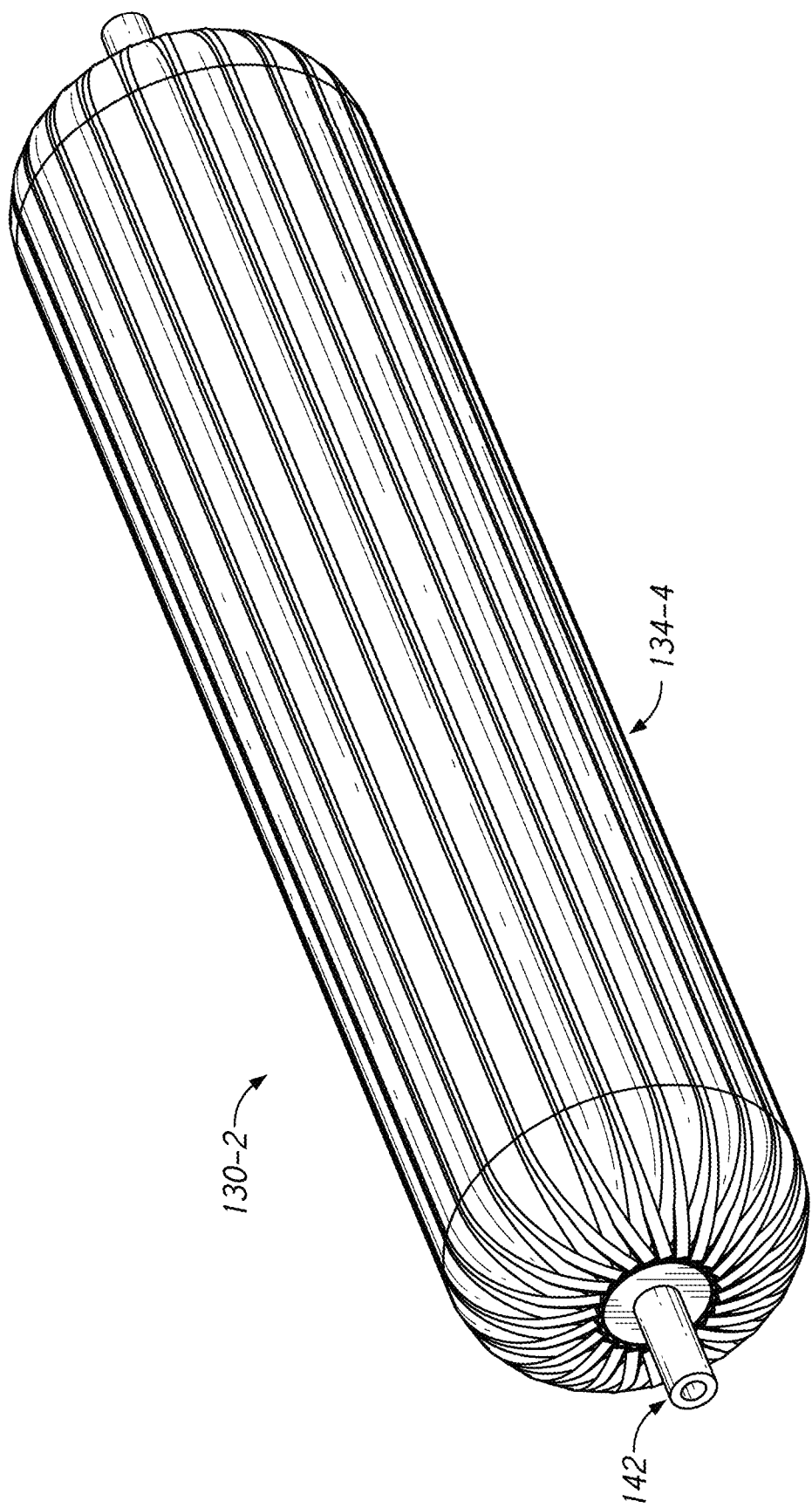
FIG. 13 illustrates a gas cylinder assembly that has a permeation barrier formed with multiple strips of barrier layer material, e.g., by repeating the process illustrated in connection with FIG. 12.

In embodiments of FIGS. 12 and 13, one or more strips (e.g., tapes, ribbons) of barrier material 134-3 are disposed over the internal pressure enclosure 120 along a longitudinal direction of the internal pressure enclosure 120 to form a permeation barrier layer 134-4 thereby to form an intermediate assembly 130-2. In some embodiments, in the permeation barrier layer 134-4, a strip of barrier material 134-3 overlaps, at least in part, another strip of barrier material as shown in FIG. 13. In some embodiments, due to overlapping of two neighboring strips, the permeation barrier layer 134-4 has a portion that is thicker than another portion.

Figure 14:
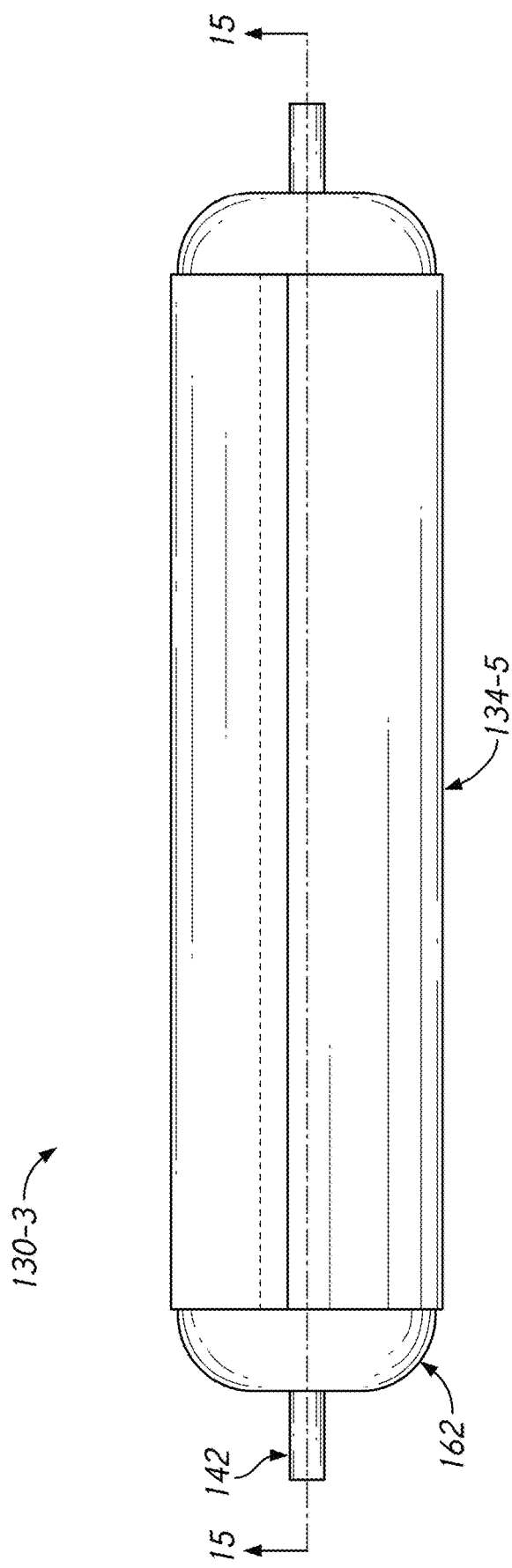
FIG. 14 shows one embodiment of a gas cylinder assembly having a sheet, e.g., a film of barrier material wrapped over a central portion of the internal pressure enclosure of FIG. 6.
Figure 15:
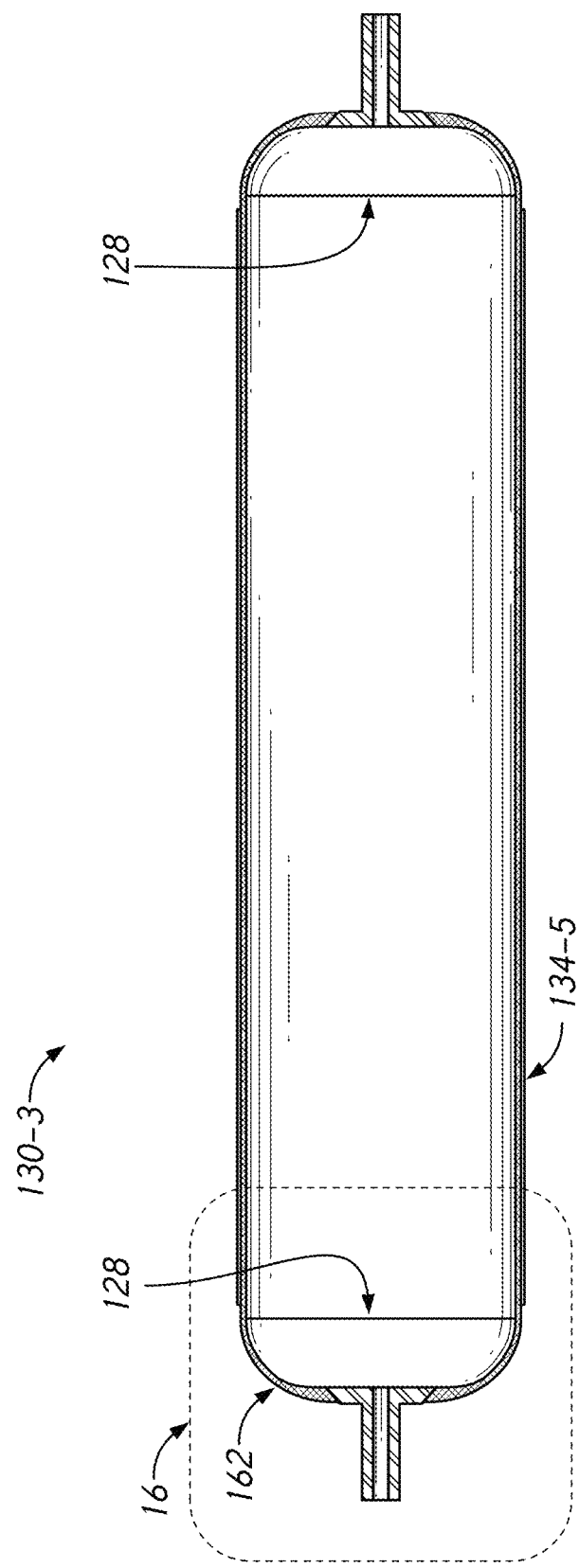
FIG. 15 is a cross-sectional view taken at section plane 15-15 shown in FIG. 14.
Figure 16:
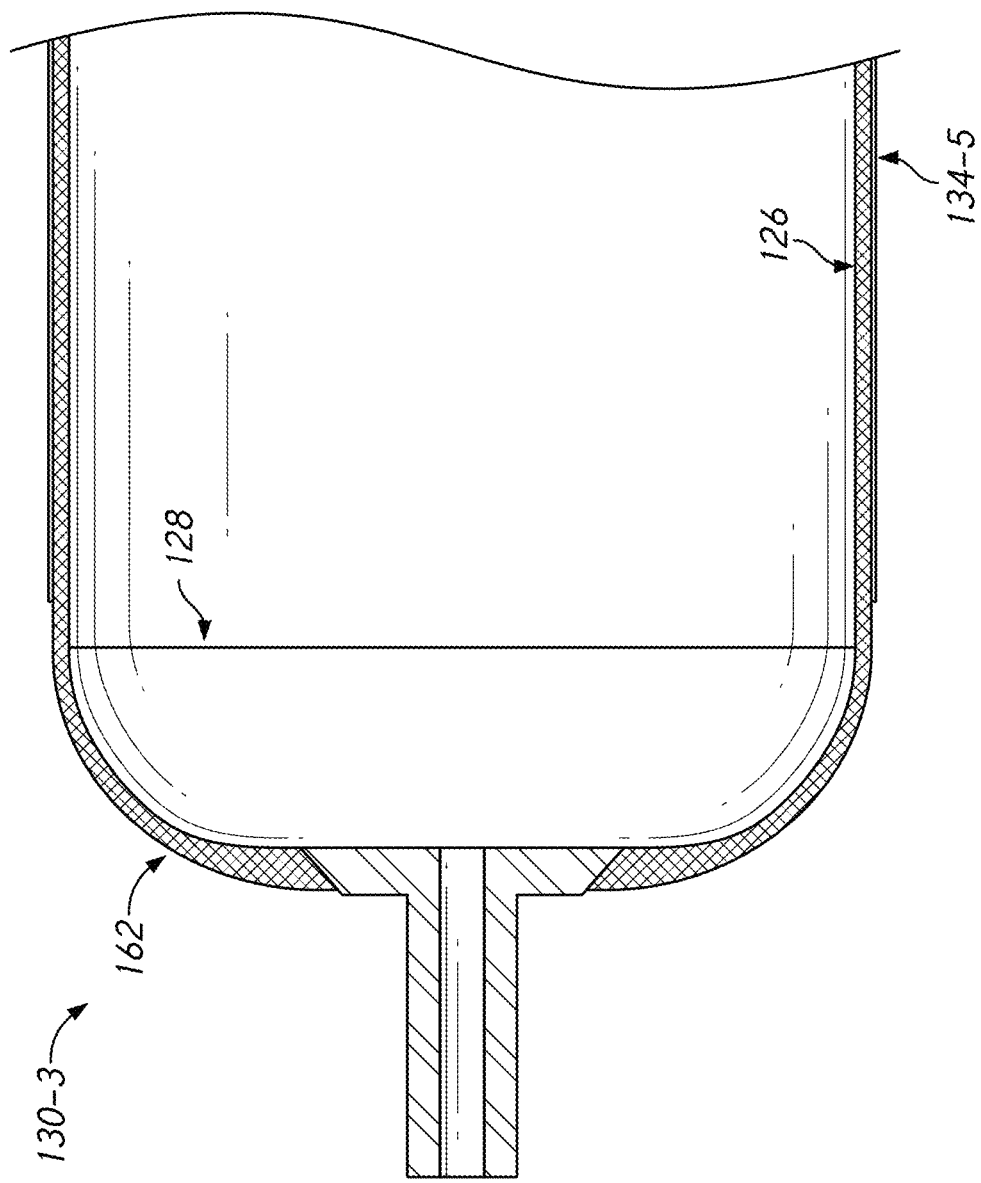
FIG. 16 is an enlarged view of detail 16 in FIG. 15.

In embodiments of FIGS. 14 to 16, one or more metal films are wrapped over the central body 126 to form the permeation barrier layer 134-5 and thereby to form an intermediate assembly 130-3. In some embodiments, as shown in FIGS. 15 and 16, the permeation barrier layer 134-5 covers the central body 126 between the weld lines 128 but does not cover the dome end portions 162, 163 such that the permeation barrier layer 134-5 has an circumferential end that is spaced apart from the dome end portions 162, 163, e.g., disposed longitudinally between weld lines 128 at which the dome end portions 162, 163 couple to the central body 126. In some embodiments, the permeation barrier layer 134-5 extends over the weld line 128 along a longitudinal direction of the intermediate assembly 130-3 to cover the longitudinal ends 181, 183 of the central body 126 and to cover the at least part of the dome end portion 162, 163.

Figure 17:
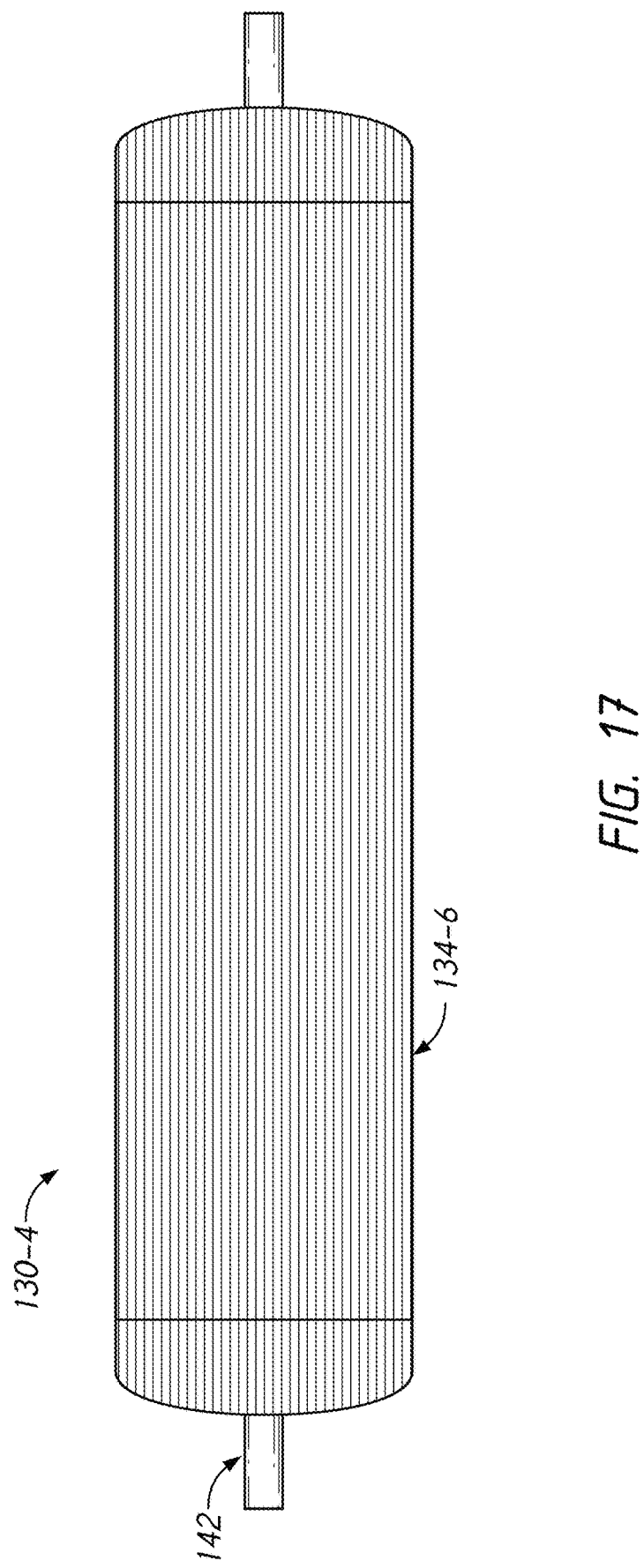
FIG. 17 shows a gas cylinder assembly having a barrier layer having a same configuration over a central portion and one or more end portions of the internal pressure enclosure of FIG. 6 according to one embodiment.

FIG. 17 illustrates further embodiments in which a permeation barrier layer 134-6 is formed over the central body 126 and also over the dome end portions 162, 163 to form an intermediate assembly 130-4. In some embodiments, when the permeation barrier 134-6 is formed by a single process or by repeating the same process (e.g. repeating the process of FIG. 12—attaching strips as shown in FIG. 12), the permeation barrier layer 134-6 maintains the same configuration over the central portion 126 and the dome end portions 162, 163 of the internal pressure enclosure 120.

Figure 18:
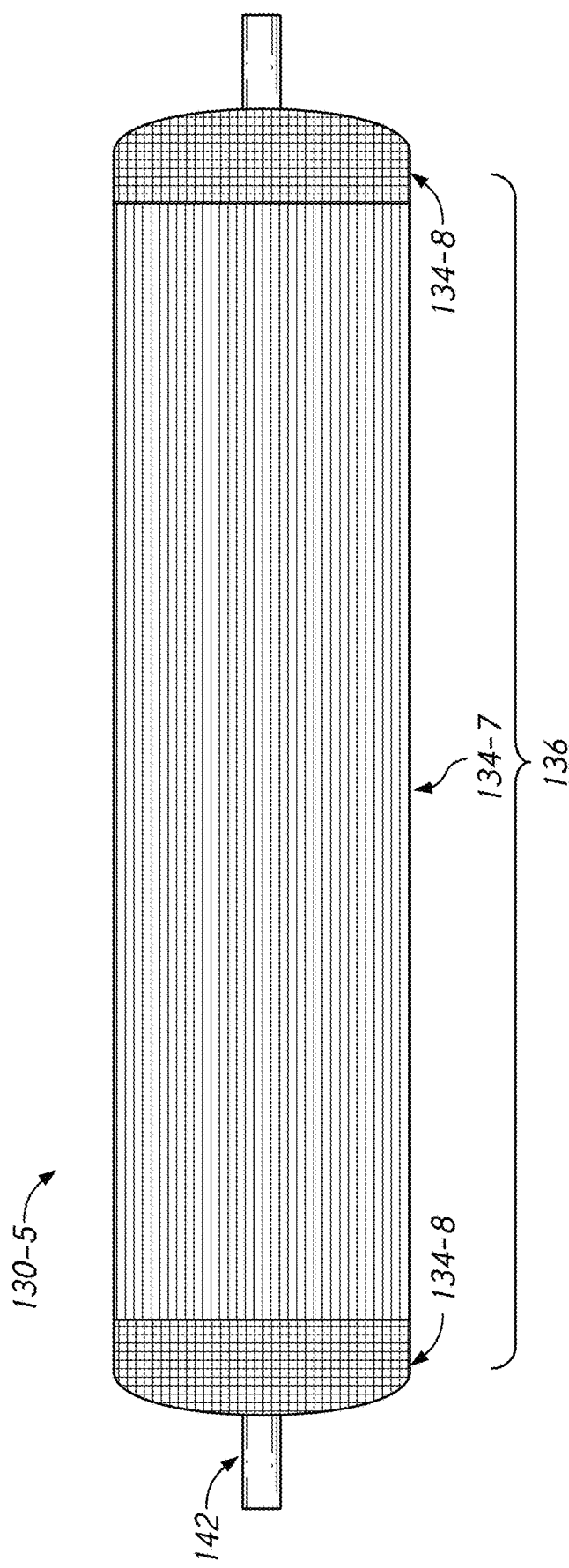
FIG. 18 shows a gas cylinder assembly having different configurations of a barrier layer over a central portion and one or both of the end portions of the internal pressure enclosure of FIG. 6 according to one embodiment.

In embodiments of FIG. 18, a permeation barrier layer 136 placed over the internal pressure enclosure 120 to form an intermediate assembly 130-5. The permeation barrier layer 136 comprises a first portion 134-7 disposed over, e.g., covering the central body 126 of the internal pressure enclosure 120, and further comprises a second portion 134-8 disposed over or covering the dome end portions 162, 163, of the internal pressure enclosure 120.

In some embodiments, the first portion 134-7 is formed using a first process, and the second portion 134-8 is formed using a second process different from the first process to disposed the permeation barrier layer 136 over a curved surface of the dome end portion 162. In some embodiments, the first portion 134-7 and the second portion 134-8 can be formed by the same or a similar process but one can be thicker. For example, the first portion 134-7 can be thicker than the second portion 134-8. Or, the second portion 134-8 can be thicker than the first portion 134-7.

In some embodiments, the first portion 134-7 and the second portion 134-8 may have different configurations (e.g. mechanical structure, chemical composition). In some embodiments, when barrier material strips are attached over the central body 126 and the dome end portions 162, 163 of the internal pressure enclosure 120 (using the process shown in FIGS. 12 and 13) to form the second portion 134-8, and subsequently additional barrier material strips are wrapped over the central body 126 (using the process shown in FIG. 10) to form the first portion 134-7, the permeation barrier layer 136 is thicker over the central body 126 than over the dome end portion 162.

After the intermediate assemblies 130, 130-1, 130-2, 130-3, 130-4, or 130-5 are prepared after forming a permeation barrier layer over the internal pressure enclosure 120, the reinforcement structure 110 can be formed over the permeation barrier layer. In some embodiments, one or more strips (or sheets) of a carbon composite are wound over an intermediate assembly to form the reinforcement structure 110. In some embodiments, a polymer resin is painted or sprayed on the carbon fiber reinforcement after disposing carbon fiber reinforcement over a permeation barrier layer to form the reinforcement structure 110. In certain embodiments, a process to cure a composite material (or a resin) placed over the permeation barrier layer is performed to complete the reinforcement structure 110.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A vehicle, comprising:
   an engine or power generation system configured to be powered by a fuel;
   one or more axles coupled to the engine or power generation system and configured to translate power generated from the engine or power generation system to a plurality of wheels to move the vehicle;
   a housing located on a side of the vehicle, behind a cab of the vehicle, on a rooftop of the vehicle, or on a tailgate of the vehicle; and
   a cylinder located in the housing and configured to store the fuel to be used by the engine or power generation system, the cylinder comprising:
      a first end portion, a second end portion, and a central body forming an enclosed cavity for storing pressurized gas;
      a reinforcement structure disposed over at least the central body; and
      a metal foil interposed between the reinforcement structure and central body, the metal foil being configured to reduce permeation of contents of the cylinder and comprising a portion of a metal foil structure comprising a polymer layer, the polymer layer of the metal foil structure disposed on a side of the metal foil such that the polymer layer is interposed between the metal foil and the reinforcement structure.

2. The vehicle of claim 1, wherein the central body has a first end coupled with the first end portion and a second end coupled with the second end portion,
   wherein the central body has an outer surface and an inner surface disposed between the
   first end and the second end, and
   wherein the central body between the inner surface and the outer surface is a continuous expanse of a homogenous material.

3. The vehicle of claim 1, wherein the metal foil structure further comprises an adhesive layer interposed between the metal foil and the central body.

4. The vehicle of claim 1, wherein the central body comprises a cylindrical body and the first end portion comprises a hemispherical member coupled with one end of the cylindrical body, wherein the metal foil is disposed over the cylindrical body.

5. The vehicle of claim 1, wherein the central body comprises a cylindrical body and the first end portion comprises a hemispherical member coupled with one end of the cylindrical body, wherein the metal foil has a circumferential end spaced apart from the hemispherical member.

6. The vehicle of claim 1, wherein the metal foil structure has a laminate structure and is wound about the central body.

7. The vehicle of claim 6, wherein the metal foil structure is wound circumferentially about the central body.

8. The vehicle of claim 1, wherein the metal foil structure comprises one or more elongate strips.

9. The vehicle of claim 8, wherein the one or more elongate strips overlap a neighboring strip.

10. The vehicle of claim 1, wherein the metal foil structure further comprises a second polymer layer disposed on a second side of the metal foil such that the second polymer layer is interposed between the metal foil and the central body.

11. A system for powering a vehicle, the system comprising:
an engine or power generation system configured to be powered by a fuel;
one or more axles coupled to the engine or power generation system and configured to translate power generated from the engine or power generation system to a plurality of wheels to move the vehicle; and
a housing configured to store a cylinder configured to store the fuel to be used by the engine or power generation system,
wherein the cylinder comprises a first end portion, a second end portion, a central body forming an enclosed cavity for storing pressurized gas, a reinforcement structure disposed over the central body, and a metal foil interposed between the reinforcement structure and central body, the metal foil being configured to reduce permeation of contents of the cylinder and comprising a portion of a metal foil structure comprising a polymer layer, the polymer layer of the metal foil structure disposed on a side of the metal foil such that the polymer layer is interposed between the metal foil and the reinforcement structure.

12. The system of claim 11, wherein the metal foil structure further comprises an adhesive layer interposed between the metal foil and the central body.

13. The system of claim 11, wherein the central body comprises a cylindrical body and the first end portion comprises a hemispherical member coupled with one end of the cylindrical body, wherein the metal foil is disposed over the cylindrical body.

14. The system of claim 11, wherein the central body comprises a cylindrical body and the first end portion comprises a hemispherical member coupled with one end of the cylindrical body, wherein the metal foil has a circumferential end spaced apart from the hemispherical member.

15. The system of claim 11, wherein the metal foil structure has a laminate structure and is wound about the central body.

16. The system of claim 15, wherein the metal foil structure is wound circumferentially about the central body.

17. The system of claim 11, wherein the metal foil structure comprises one or more elongate strips.

18. The system of claim 17, wherein the one or more elongate strips overlap a neighboring strip.

19. The system of claim 11, wherein the metal foil structure further comprises a second polymer layer disposed on a second side of the metal foil such that the second polymer layer is interposed between the metal foil and the central body.

20. An apparatus comprising:
an internal pressure enclosure comprising:
a first end portion;
a second end portion; and
a central body having a first end coupled with the first end portion and a second end coupled with the second end portion, the central body further having an outer surface and an inner surface disposed between the first end and the second end,
the first end portion, the second end portion, and the central body forming an enclosed cavity for storing a pressurized gas wherein the inner surface of the central body forms at least a portion of an innermost surface of the internal pressure enclosure, and
the central body between the inner surface and the outer surface being a continuous expanse of a homogenous material;
a reinforcement structure disposed over the central body; and
a permeation barrier layer interposed between the reinforcement structure and the outer surface of the central body, the permeation barrier layer being configured to reduce permeation of contents of the internal pressure enclosure and comprising a metal foil and a polymer layer, the polymer layer disposed on a side of the metal foil such that the polymer layer is interposed between the metal foil and the reinforcement structure.

21. The apparatus of claim 20, wherein the metal foil is an aluminum foil having a thickness in a range between 0.0005 in and 0.05 inches.

22. The apparatus of claim 20, further comprising an adhesive layer interposed between the metal foil and the central body.

23. The apparatus of claim 20, wherein the central body comprises a cylindrical body and the first end portion comprises a hemispherical member coupled with one end of the cylindrical body, wherein the permeation barrier layer is disposed over the cylindrical body.

24. The apparatus of claim 20, wherein the central body comprises a cylindrical body and the first end portion comprises a hemispherical member coupled with one end of the cylindrical body, wherein the permeation barrier layer has a circumferential end spaced apart from the hemispherical member.

25. The apparatus of claim 20, wherein the permeation barrier layer has a laminate structure and is wound about the central body.

26. The apparatus of claim 25, wherein the permeation barrier layer is wound circumferentially about the central body.

27. The apparatus of claim 20, wherein the permeation barrier layer comprises one or more elongate strips.

28. The apparatus of claim 27, wherein the one or more elongate strips overlap a neighboring strip.

29. The apparatus of claim 20, wherein the reinforcement structure is disposed directly on the permeation barrier layer.

30. The apparatus of claim 20, wherein the permeation barrier layer further comprises a second polymer layer disposed on a second side of the metal foil such that the second polymer layer is interposed between the metal foil and the central body.

* * * * *